US012025625B2

(12) United States Patent
Musacchio et al.

(10) Patent No.: US 12,025,625 B2
(45) Date of Patent: Jul. 2, 2024

(54) INTERFACE MODULE FOR ROBOTIC LOADING AND UNLOADING OF A SAMPLE MANAGER FOR LIQUID CHROMATOGRAPHY

(71) Applicant: Waters Technologies Corporation, Milford, MA (US)

(72) Inventors: Jeffrey Musacchio, Sharon, MA (US); Scott Kelley, Brookline, MA (US)

(73) Assignee: Waters Technologies Corporation, Milford, MA (US)

( * ) Notice: Subject to any disclaimer, the term of this patent is extended or adjusted under 35 U.S.C. 154(b) by 284 days.

(21) Appl. No.: 16/939,509

(22) Filed: Jul. 27, 2020

(65) Prior Publication Data
US 2021/0033629 A1     Feb. 4, 2021

Related U.S. Application Data

(60) Provisional application No. 62/879,653, filed on Jul. 29, 2019.

(51) Int. Cl.
*G01N 35/00*      (2006.01)
*G01N 35/04*      (2006.01)
(Continued)

(52) U.S. Cl.
CPC ... *G01N 35/00584* (2013.01); *G01N 35/0099* (2013.01); *G01N 35/04* (2013.01);
(Continued)

(58) Field of Classification Search
CPC ..... G01N 2035/042; G01N 2035/0422; G01N 2035/0429; G01N 2035/0465;
(Continued)

(56) References Cited

U.S. PATENT DOCUMENTS 4,681,741 A * 7/1987 Hanaway ........... G01N 35/1095
                                                        222/137
5,233,844 A * 8/1993 Knippscheer ........ A01N 1/0252
                                                        414/331.05
(Continued)

FOREIGN PATENT DOCUMENTS

FR     2788042 A1 * 7/2000 ................ B01L 1/00
FR     2788042 A1    7/2000
(Continued)

OTHER PUBLICATIONS

International Search Report and Written Opinion in PCT/US2020/043683 dated Oct. 30, 2020.
(Continued)

*Primary Examiner* — Benjamin R Whatley
(74) *Attorney, Agent, or Firm* — Schmeiser, Olsen & Watts LLP; William G. Guerin

(57) ABSTRACT

Described is an interface module for robotic loading and unloading of a liquid chromatography sample manager. The module includes a transfer drawer receiving apparatus having a device track and a drawer drive system configured to transport a transfer drawer along the device track into and out from a sample tray of a sample manager. The transfer drawer receives a sample-vial carrier that holds samples to be analyzed. The module further includes a window apparatus that has a window controllable to be in an open state or a closed state. When in the open state, transport of the transfer drawer through the window into or out from the sample manager permits loading of the sample-vial carrier into the sample tray and unloading of the sample-vial carrier from the sample tray. In the closed state, the window apparatus substantially seals the internal environment of the sample manager from the ambient environment.

8 Claims, 18 Drawing Sheets

(51) Int. Cl.
*G01N 30/24* (2006.01)
*G01N 35/02* (2006.01)

(52) U.S. Cl.
CPC .......... *G01N 30/24* (2013.01); *G01N 35/026* (2013.01); *G01N 35/028* (2013.01); *G01N 2035/042* (2013.01); *G01N 2035/0422* (2013.01); *G01N 2035/0429* (2013.01); *G01N 2035/0465* (2013.01); *G01N 2035/0484* (2013.01); *G01N 2035/0498* (2013.01)

(58) Field of Classification Search
CPC ... G01N 2035/0484; G01N 2035/0498; G01N 35/00584; G01N 35/0099; G01N 35/026; G01N 35/028; G01N 35/04; G01N 30/24
See application file for complete search history.

(56) References Cited

U.S. PATENT DOCUMENTS

| | | |
|---|---|---|
| 9,194,847 B2 | 11/2015 | Burnett et al. |
| 2001/0043031 A1 | 11/2001 | Gonska et al. |
| 2010/0211211 A1* | 8/2010 | Nedu ................ G01N 35/0099 700/218 |
| 2010/0254854 A1* | 10/2010 | Rich ..................... G01F 23/14 422/64 |
| 2014/0079606 A1 | 3/2014 | Burnett et al. |
| 2017/0217027 A1* | 8/2017 | Boucard ............... B25J 19/023 |
| 2019/0234977 A1* | 8/2019 | Antinjuntti ........... G01N 35/02 |

FOREIGN PATENT DOCUMENTS

| | | |
|---|---|---|
| WO | 2018143680 A1 | 8/2018 |
| WO | 2019241337 A1 | 12/2019 |

OTHER PUBLICATIONS

International Preliminary Report on Patentability in PCT/US2020/043683 dated Feb. 10, 2022.
"Vanquish UHPLC System: Revolutionize Your UHLPC Experience," 2016, Thermo Fisher Scientifc Inc.
Examination Report in European patent application No. 20754557.5 dated Aug. 2, 2023.
Examination Report in European Patent Application No. 20754557.5 mailed on Mar. 22, 2024.

* cited by examiner

INTERFACE MODULE FOR ROBOTIC LOADING AND UNLOADING OF A SAMPLE MANAGER FOR LIQUID CHROMATOGRAPHY

RELATED APPLICATION

This application claims the benefit of the earlier filing date of U.S. Provisional Patent Application Ser. No. 62/879,653 filed Jul. 29, 2019 and titled "Interface Module for Robotic Loading and Unloading of a Sample Manager for Liquid Chromatography," the entirety of which is incorporated herein by reference.

FIELD OF THE INVENTION

The technology relates generally to an automated liquid chromatography system. More particularly, the technology relates to a method of loading samples into a sample manager of a liquid chromatography system.

BACKGROUND

Liquid chromatography (LC) systems commonly use a sample manager to acquire a sample and inject the sample into the system flow (i.e., mobile phase) of the chromatography system. Sample managers are generally provided as a stackable or rack-mountable system module that may be in a vertical arrangement with other LC system modules. In a conventional sample manager, a sample-vial carrier having a capacity to hold a number of sample-vials (e.g., 96 vials in a grid configuration) is loaded into the sample manager by a user. Loading is accomplished by opening an access door on the front of the sample manager and manually placing the sample-vial carrier into a compartment in a sample tray. When the chromatographic separations for all samples to be processed are completed, the user opens the access door and removes the sample-vial carrier from the sample tray.

Recently, robotic systems have been used to perform the sample loading and unloading functions to increase use of the LC system by reducing user participation. For example, a robot may open the access door to the sample manager, remove a sample-vial carrier from the sample tray, return the sample-vial carrier to a sample storage unit (e.g., a sample organizer) or other location, retrieve another sample-vial carrier for testing from the sample storage unit, load the retrieved sample-vial carrier into the sample manager and close the door on the sample manager. Due to the complexity and time required for the robot to open and close the door along with the intervening robotic tasks, the door may remain open for the entire loading and unloading process. The period when the door is open may be substantial, for example, tens of seconds or more, leading to a significant variation in the internal temperature of the sample manager due to exposure to the ambient environment. It may be necessary to wait a predetermined time for the internal temperature to return to an acceptable level or to monitor the internal temperature to ensure the return to the acceptable temperature. The time delay incurred may limit the throughput of the LC system.

Chains that are structurally precluded from back-bending have been created for various applications and to perform various functions. For example, chains precluded from back-bending today are typically used as cable carriers that provide a cavity within which to house cables that are attached to a moving component of a system. These wire-bearing "drag chains" are designed without the need to withstand the ability of pushing and pulling, i.e. forces acting on the chain parallel to the length of the chain. Further, chains precluded from back-bending often incorporate complicated link designs with multiple separable features (i.e. links, pins, etc.) which need to be assembled to form the chain. Still further, the structures of known cable carrying chains are typically significantly restrictive in terms of the rotation structurally allowable between two chain links. Moreover, typical one-way bending chain systems do not utilize chains for precision movement of laboratory test specimens, such as liquid chromatography samples and sample holding trays.

SUMMARY

In one example, an interface module for robotic loading and unloading of a liquid chromatography sample manager includes a transfer drawer receiving apparatus and a window apparatus. The transfer drawer receiving apparatus includes a device track and a drawer drive system configured to transport a transfer drawer along the device track into and out from a sample tray of a sample manager. The transfer drawer is configured to receive a sample-vial carrier. The window apparatus includes a window controllable to be in an open state and a closed state. When in the open state, transport of the transfer drawer through the window into the sample manager is enabled for loading of the sample-vial carrier into the sample tray and transport of the transfer drawer out from the sample manager and through the window is enabled for unloading of the sample-vial carrier from the sample tray. The window apparatus substantially seals an internal environment of the sample manager from an ambient environment when the window is in the closed state.

The drawer drive system may include a chain drive system.

The window may include a window panel movable between a first position when the window is in the closed state and a second position when the window is in the open state. The sample manager may include a housing having an aperture. The housing defines an internal environment of the sample manager and the window panel is adjacent to the aperture when the window panel is in the first position. The window apparatus may further include a conformable seal disposed on the window panel and in engagement with an outer surface of the housing to substantially seal the housing at the aperture when the window panel is in the first position.

The interface module may include a processor in communication with the transfer drawer receiving apparatus to control the transport of the transfer drawer. The processor may be in further communication with a robotic system used to provide a sample-vial carrier to the transfer drawer and to remove the sample-vial carrier from the transfer drawer The interface module may include a processor in communication with the window apparatus to control the window to be in one of the open state and the closed state.

In another example, an apparatus for automatic loading of samples into a liquid chromatography system includes a sample manager, an interface module for robotic loading and unloading of a liquid chromatography system, and a robotic system. The sample manager includes a sample tray having at least one compartment to receive a sample-vial carrier. The interface module includes a transfer drawer receiving apparatus and a window apparatus. The transfer drawer receiving apparatus includes a device track and a drawer drive system configured to transport a transfer drawer along the device track into and out from a sample tray of a sample manager. The transfer drawer is configured to receive a sample-vial carrier. The window apparatus includes a window controllable to be in an open state and a closed state. When in the open statue, transport of the transfer drawer through the window into the sample manager is enabled for loading of the sample-vial carrier into the sample tray and to transport of the transfer drawer out from the sample manager and through the window is enabled for unloading of the sample-vial carrier from the sample tray. The window apparatus substantially seals an internal environment of the sample manager from an ambient environment when the window is in the closed state. The robotic system is configured to provide a sample-vial carrier to the transfer drawer and to remove the sample-vial carrier from the transfer drawer.

The window includes a window panel movable between a first position when the window is in the closed state and a second position when the window is in the open state. The sample manager may include a housing having an aperture. The housing defines an internal environment of the sample manager. The window panel is adjacent to the aperture when the window panel is in the first position.

The apparatus may include a processor in communication with the transfer drawer receiving apparatus to control the transport of the transfer drawer. The processor may be in further communication with the robotic system.

The apparatus may include a processor in communication with the window apparatus to control the window to be in one of the open state and the closed state. The processor may be in further communication with the robotic system.

The sample manager may include a rotary drive mechanism to rotate the sample tray.

BRIEF DESCRIPTION OF THE DRAWINGS

The above and further advantages of this invention may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the invention.

DETAILED DESCRIPTION

Reference in the specification to "one example" or "an example" means that a particular feature, structure or characteristic described in connection with the example is included in at least one example of the teaching. References to a particular example within the specification do not necessarily all refer to the same example.

The present teaching will now be described in more detail with reference to examples shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

Figure 1:
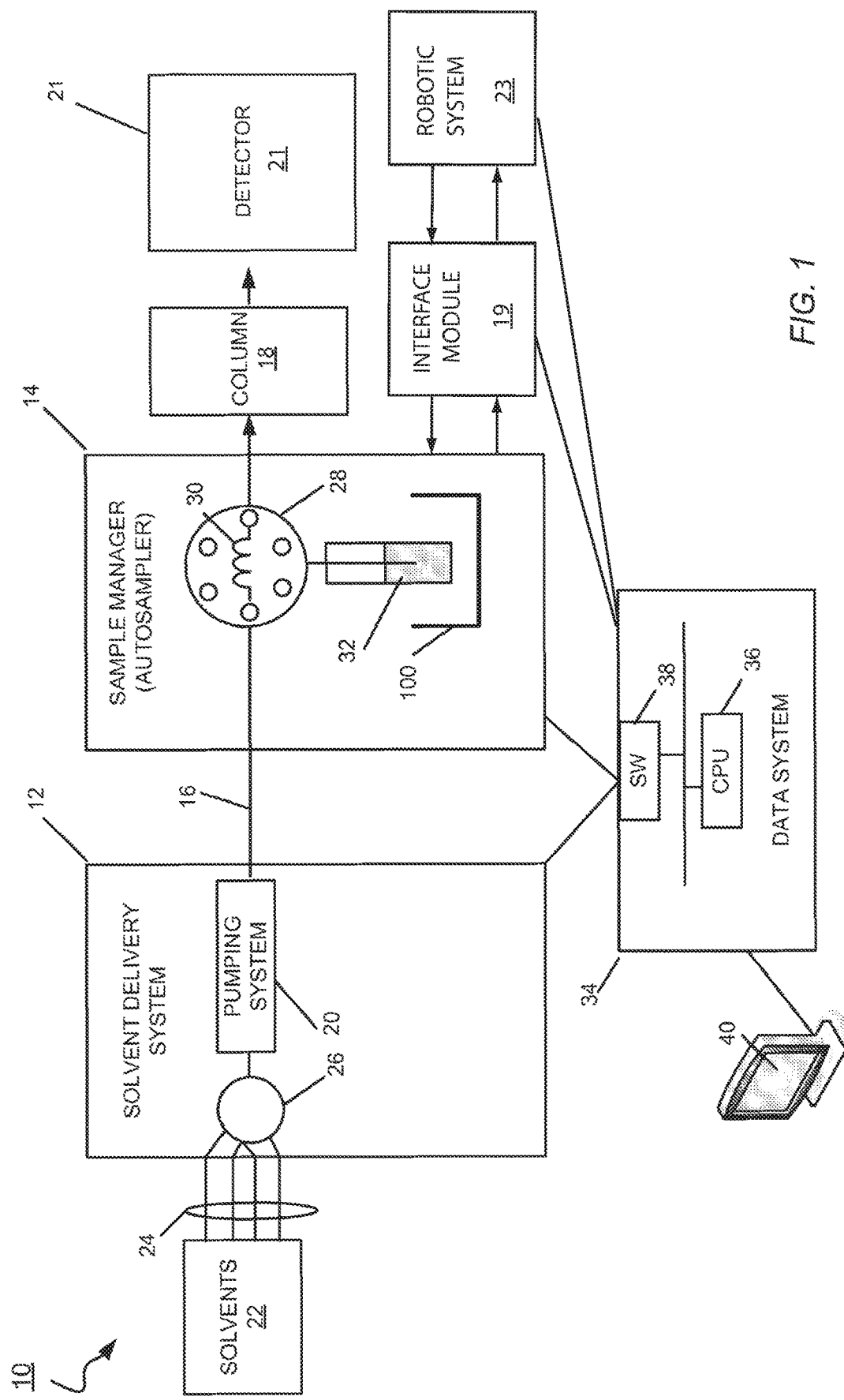
FIG. 1 is a block diagram of an example of a liquid chromatography system and shows an interface module and solvent delivery system in fluidic communication with a conventional sample manager.

FIG. 1 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18 and in mechanical and electrical communication with an interface module 19. A detector 21, for example, a mass spectrometer, is in fluidic communication with the column 18 to receive the elution. The interface module 19 may be configured to receive a sample-vial carrier from a robotic system 23 and load it into the sample manager 14, and to retrieve the sample-vial carrier from the sample manager 14 and provide it to the robotic system 23. The sample-vial carrier may include a plurality of sample-vials each containing a sample to be separated by the liquid chromatography system. "Sample-vial carrier" herein means any device configured to carry one or more samples such as a device that holds vials containing sample or as a well plate with individual wells each configured to hold a sample. The robotic system 23 may be configured to obtain the sample-vial carrier from a remote storage unit and to return the sample-vial carrier to the remote storage unit or a different remote storage unit or location.

The solvent delivery system 12 includes a pumping system 20 in fluidic communication with solvent reservoirs 22 from which the pumping system 20 draws solvents (liquid) through tubing 24. In one embodiment, the pumping system 20 includes a low-pressure mixing gradient pumping system having two pumps fluidically connected in series. In the low-pressure gradient pumping system, the mixing of solvents occurs upstream of the pump, and the solvent delivery system 12 has a mixer 26 in fluidic communication with the solvent reservoirs 22 to receive various solvents in metered proportions. This mixture of solvents (i.e., mobile phase) may be based on a variation in the rate at which each solvent contributes to the mixture. Thus, the mobile phase composition can vary over time according to a predetermined composition gradient.

The pumping system 20 is in fluidic communication with the mixer 26 to draw a continuous flow of the mobile phase therefrom for delivery to the sample manager 14. Examples of solvent delivery systems that can be used to implement the solvent delivery system 12 include, but are not limited to, the ACQUITY® Binary Solvent Manager and the ACQUITY® Quaternary Solvent Manager, manufactured by Waters Corp. of Milford, Massachusetts.

The sample manager 14 may include an injector valve 28 having a sample loop 30. The sample manager 14 operates in one of two states: a load state and an injection state. In the load state, the configuration of the injector valve 28 is such that the sample manager 14 loads a sample 32 into the sample loop 30. The sample 32 is drawn from a vial held in a sample-vial carrier 100. In the injection state, the configuration of the injector valve 28 changes so that the sample manager 14 introduces the sample in the sample loop 30 into the continuously flowing mobile phase from the solvent delivery system 12. The mobile phase thus carries the injected sample to the column 18. In other embodiments, a flow through needle (FTN) may be utilized instead of a fixed-loop sample manager. Using an FTN approach, the sample may be drawn into the needle and then the needle may be moved into a seal. A valve is then switched to configure the needle to be in-line with the solvent delivery system 12.

The liquid chromatography system 10 further includes a data system 34 that is in signal communication with the solvent delivery system 12 and the sample manager 14. The data system 34 has a processor 36 and a switch 38 (e.g. an Ethernet switch) for handling signal communication between the solvent delivery system 12, sample manager 14, interface module 19 and (optionally) robotic system 23, as described herein. Signal communication among the various modules and systems can be, for example, electrical or optical and may be based on wireless or wired transmission. A host computing system 40 is in communication with the data system 34 and includes a user interface by which a user can download various parameters and profiles (e.g., mobile phase composition gradient) to the data system 34.

Figure 2:
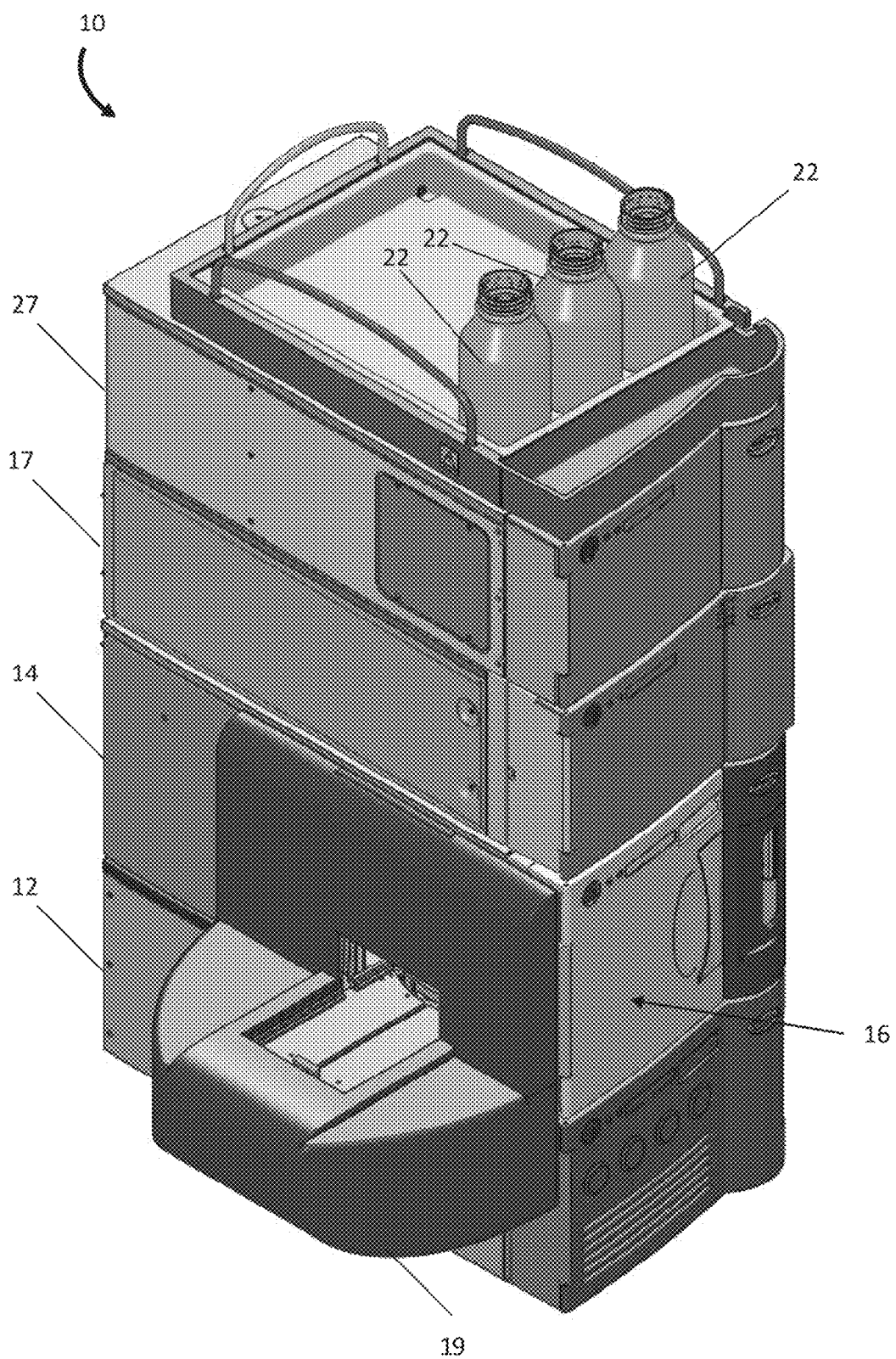
FIG. 2 is a perspective view of the liquid chromatography system of FIG. 1.

FIG. 2 shows a perspective view of the liquid chromatography system 10 including the solvent delivery system 12, the sample manager 14, a column manager 17 that includes the chromatographic column 18, the solvents 22, the interface module 19 and a detector module 27 that includes the detector 21. Each of the solvent delivery system 12, the sample manager 14, the chromatographic column 18, the detector 21 and the interface module 19 may include a housing or body within which the various features, such as the data system 34, the sample loop 30 and injector valve 28, the pumping system 20, the mixer 26 and the tubing 24, may be enclosed. The various components may be interconnected with fluidic tubes and be in signal communication with the processor 36 and/or other elements of the data system 34. The liquid chromatography system 10 is shown with the solvent delivery system 12, sample manager 14, column manager, detector module and a tray for holding the solvents 22 in a vertical stack. The interface module 19 and the sample manager 14 may be coupled to each other through openings (i.e., apertures) in their respective housings, as described below.

The interface module 19 includes a transfer drawer receiving apparatus and a window apparatus. The transfer drawer receiving apparatus includes a device track and a drawer drive system. The device track receives a sample-vial carrier on a transfer drawer. The drawer drive system transports the transfer drawer having the sample-vial carrier disposed thereon into and out from a sample tray of the sample manager. As used herein, a sample tray is an internal component of the sample manager. The sample tray can accept and hold one or more sample-vial carriers or sample well plates. For example, the sample tray may be a rotary tray having one or more compartments to receive a sample-vial carrier or sample well plate. The window apparatus includes a window controllable to be in an open state and a closed state. When in the open state, the window enables transport of the transfer drawer into the sample manager for loading of the sample-vial carrier into the sample tray and enables transport of the transfer drawer out from the sample manager for unloading of the sample-vial carrier from the sample tray. When in the closed state, the window substantially seals an internal environment of the sample manager from the ambient environment.

Figure 3:
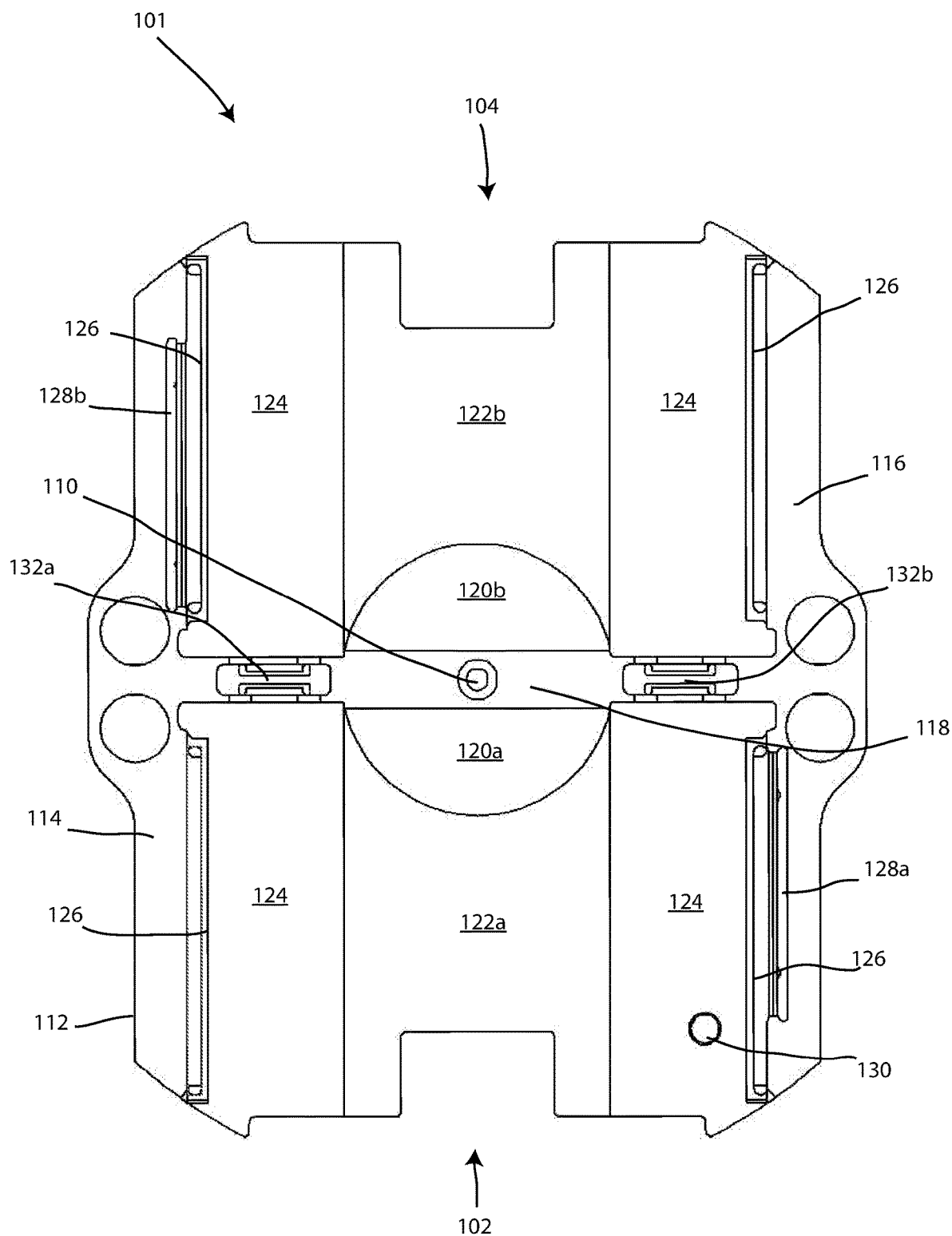
FIG. 3 is a top view of an implementation of a sample tray in the sample manager of FIGS. 1 and 2.

FIG. 3 shows a top view of an implementation of a sample tray 101 of the sample manager 14. The sample tray 101 includes two tray locations, a first location 102 and a second location 104. The two tray locations 102, 104 may be symmetrically inserted, like the two halves of a playing card. Each compartment may hold a transfer drawer 150 (see FIG. 4). In one example, the first and second locations 102, 104 are each also about 3.5" wide by 5" deep to accommodate the transfer drawers 150. The locations 102, 104 and the transfer drawers 150 may be designed to support sample-vial carriers or sample-vial plates of different dimensions. The locations 102, 104 may be compartments, slots, carriages, chambers, cells, or the like.

The sample tray 101 includes a base 112. The base 112 includes a first side wall 114, a second side wall 116 opposing the first side wall 114, and a cross wall 118 bisecting each of the opposing side walls 114, 116. The side walls 114, 116 and the cross wall 118 may be of a uniform height and, when viewed from above, together form the capital letter H, with the cross wall 118 dividing the sample tray 101 into the two tray locations 102, 104.

Midway in the cross wall 118 is a circular opening 110 for receiving a bolt or a post by which to secure the sample tray 101 to a rotary drive mechanism disposed below the sample chamber. On each of the opposite sides of the cross wall 108 is a semicircular platform 120a, 120b. The semicircular platforms 120a, 120b rise above sunken surfaces 122a, 122b of the base 112. The two semicircular platforms 120a, 120b are opposite halves of a circular platform bisected by the cross wall. This circular platform and the circular opening 110 in the cross wall 118 are concentric.

Along each side wall 114, 116 on both sides of the cross wall 118 is a side platform 124 raised above the plane of the depressed or sunken surfaces 122a, 122b. Each side wall 114, 116 has a groove 126. Each side wall 114, 116 further includes a leaf spring assembly 128a, 128b, respectively, diagonally opposed from each other across the sample tray 101. Each leaf spring assembly 128 is used to bias a transfer drawer 150 against an opposing side wall 116, 114.

The sample tray 101 includes one calibration hole 130, which is in one of the side platforms 124. The calibration hole 130 is an exception to the inverted symmetry between the tray locations 102, 104, there being only one such hole for the sample tray 101. In this example, the calibration hole 130 is in the first location 102 of the sample tray 101 and penetrates entirely through the side platform 124 with a hole in the datum plate. A metallic or plastic pin is insertable through the calibration hole and datum plate hole. During calibration, an encoder detects this pin and uses it to establish a home (i.e. reference) position from which all other tray positions are known. The pin may be removed after calibration.

A first tray magnet 132a and a second tray magnet 132b may be affixed within the cross wall 118 of the sample tray 101. More than two magnets are contemplated as shown. In other examples, a single magnet with an opening aligned to the circular opening 110 may extend across the entirety of the cross wall 118. While the magnets 132a, 132b are shown on a top or upper surface of the sample tray 101, in other examples, the magnets 132a, 132b may be located on an underside or bottom surface of the sample tray 101 such that the magnetic fields of the magnets 132a, 132b may extend through the body of the sample tray 101, as described in U.S. Pat. No. 9,194,847, which is hereby incorporated by reference. Whatever the implementation, the magnets 132a, 132b located on the sample tray 101 may be configured to magnetically attract to corresponding magnets on the transfer drawers 150 and to retain the transfer drawer 150 in a removably coupled position with respect to the transfer tray 101 as described below.

Figure 4:
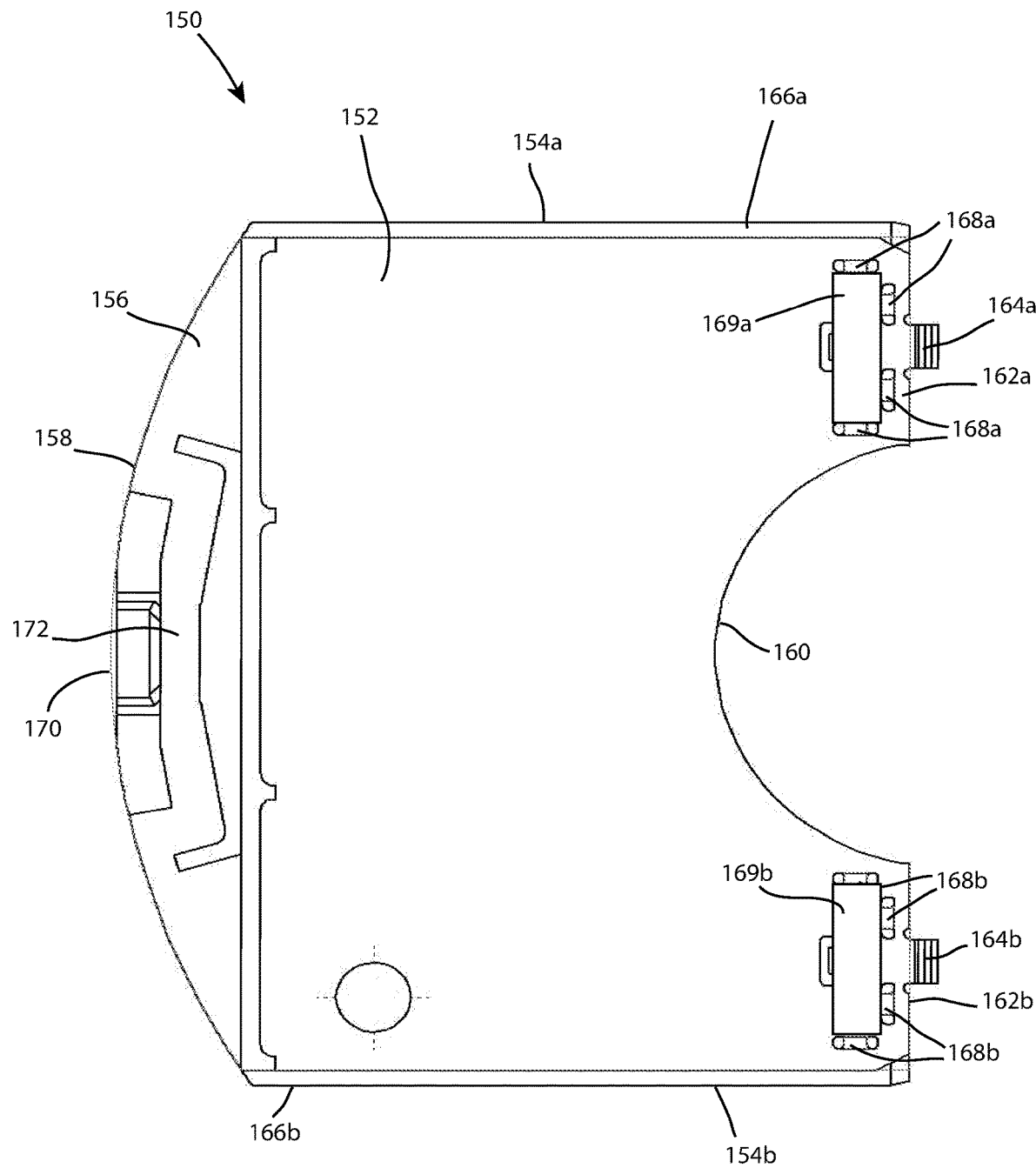
FIG. 4 is a top view of an example of a transfer drawer.

FIG. 4 depicts a top view of a transfer drawer 150 in accordance with one example. The transfer drawer 150 may be a rectangular sample-vial carrier that is 3.5" wide by 5" deep. The transfer drawer 150 has a planar surface 152 with opposing side edges 154a, 154b, a handle 156 at a front edge 158, and an arcuate rear edge 160 that forms prongs 162a, 162b. Extending from each of the prongs 162a, 162b is a post 164a, 164b, respectively. The posts 164a, 164b may serve as positional guides or locators for directing a sample-vial carrier onto the planar surface 152 of the transfer drawer 150. Each side edge 154a, 154b may further include a side tongue 166a, 166b extending along a length of the edge. The side tongues 166a, 166b enter the grooves 126 of the sample tray 101. As the transfer drawer 150 slides into one of the first or second locations 102, 104, the side tongues 142 slide through the grooves 126 in the side platforms 124.

The transfer drawer 150 includes a first plurality of drawer magnet holders 168a located in the first prong 162a holding a first drawer magnet 169a. The transfer drawer 150 includes a second plurality of drawer magnet holders 168b located in the second prong 162b holding a second drawer magnet 169b. The drawer magnet holders 168a, 168b may be configured to hold, retain, or secure the first and second drawer magnets 169a, 169b to the transfer drawer 150. In other examples, the first and second rear magnets 169a, 169b may be affixed or otherwise attached, fashioned, stuck or glued to the prongs 162a, 162b. When the transfer drawer 150 is inserted into one of the locations 102, 104 of the sample tray 101, the first and second drawer magnets 169a, 169b may be aligned with, and magnetically attracted to, the first and second tray magnets 132a, 132b, respectively, as described in more detail below. The first and second drawer magnets 169a, 169b may each be a single magnet, or may each include a plurality of magnets in other examples. The first and second drawer magnets 169a, 169b may be any number of magnets configured to provide the desired level of magnetic attraction to the first and second tray magnets 132a, 132b. While the first and second drawer magnets 169a, 169b are shown located on the upper surface or top of the transfer drawer 150, in other examples, the first and second drawer magnets 169a, 169b may be affixed to the underside or bottom surface of the transfer drawer 150.

The transfer drawer 150 further includes a transfer magnet 170 disposed on the handle 156. The transfer magnet 170 is used to engage a drive magnet of a drawer drive system used to push or pull the transfer drawer 150 into or out from the sample tray 101 of the sample manager 14.

Figure 5A:
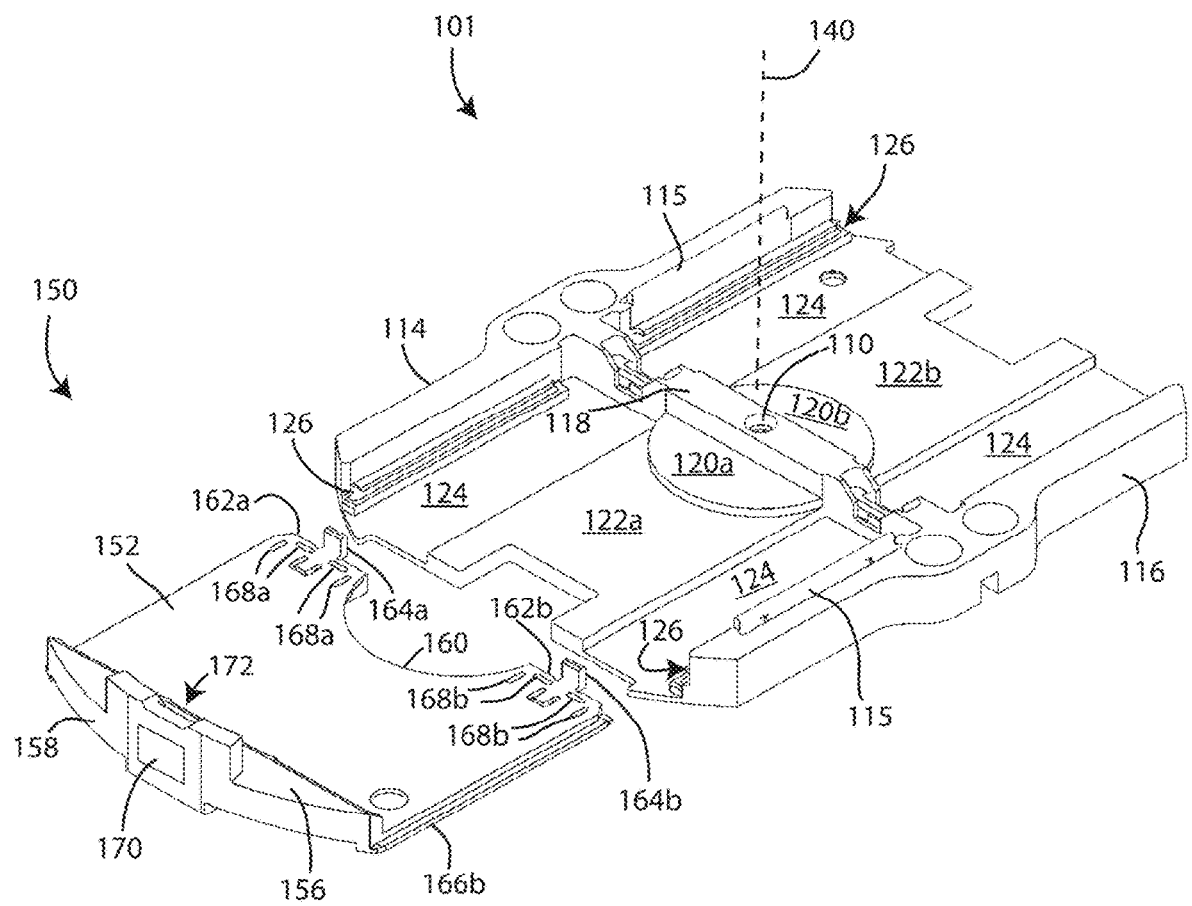
FIG. 5A is a perspective view of the sample tray and transfer drawer disconnected from each other.
Figure 5B:
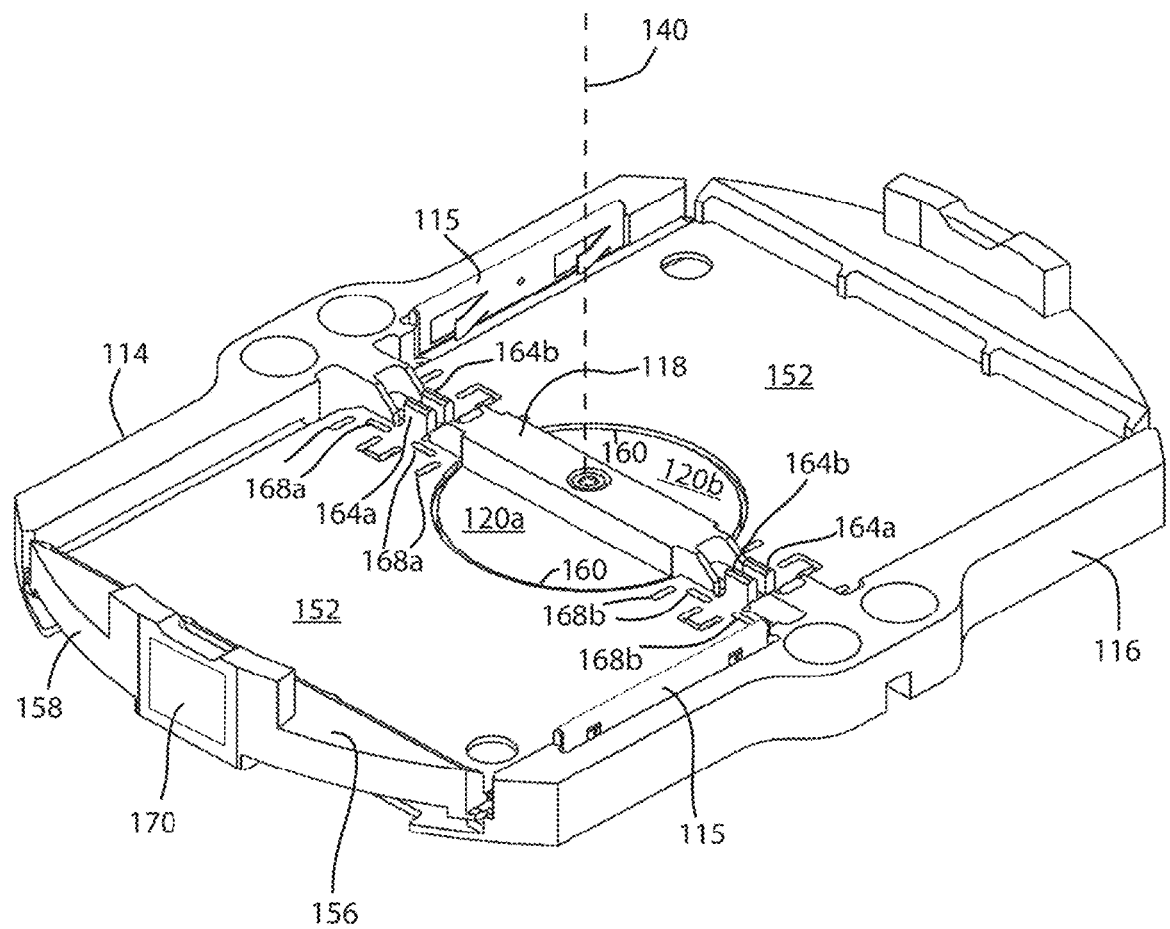
FIG. 5B is a perspective view of the sample tray occupied by two transfer drawers in their fully inserted positions.

FIG. 5A is a perspective view of the sample tray 101 and transfer drawer 150 disconnected from each other and FIG. 5B is a perspective view of the sample tray 101 occupied by two transfer drawers 150 in their fully inserted positions. Although absent from FIG. 5B to better show the posts 164 relative to open regions in the cross wall 118, the drawer magnets 169 on the transfer drawer 150 are in engagement with the tray magnets 132. Thus, the magnets 132, 169 ensure an accurate positioning of each transfer drawer 150 along the direction of drawer travel and the leaf spring assemblies 128 ensure an accurate position of each transfer drawer 150 in the direction perpendicular to the direction of drawer travel. The sample tray 101 may be rotated about the vertical axis 140 to accommodate either manual or robotic loading. For example, the sample tray 101 may be oriented in a first position such that one of the transfer drawers 150 can be accessed from the front of the sample manager 14 through the access door 16 (FIG. 2) for manual loading and unloading. The other transfer drawer 150 can be accessed through the access door 16 by rotating the sample tray 101 by 180°. Alternatively, the sample tray 101 may be oriented at a second position that is at 90° degrees to the first position such that one of the transfer drawers 150 can be accessed through a side access in the sample manager, as described below, for robotic loading and unloading. Rotating by 180° from the second position allows the other transfer drawer 150 to be loaded or unloaded by the robotic system 23.

Figure 6:
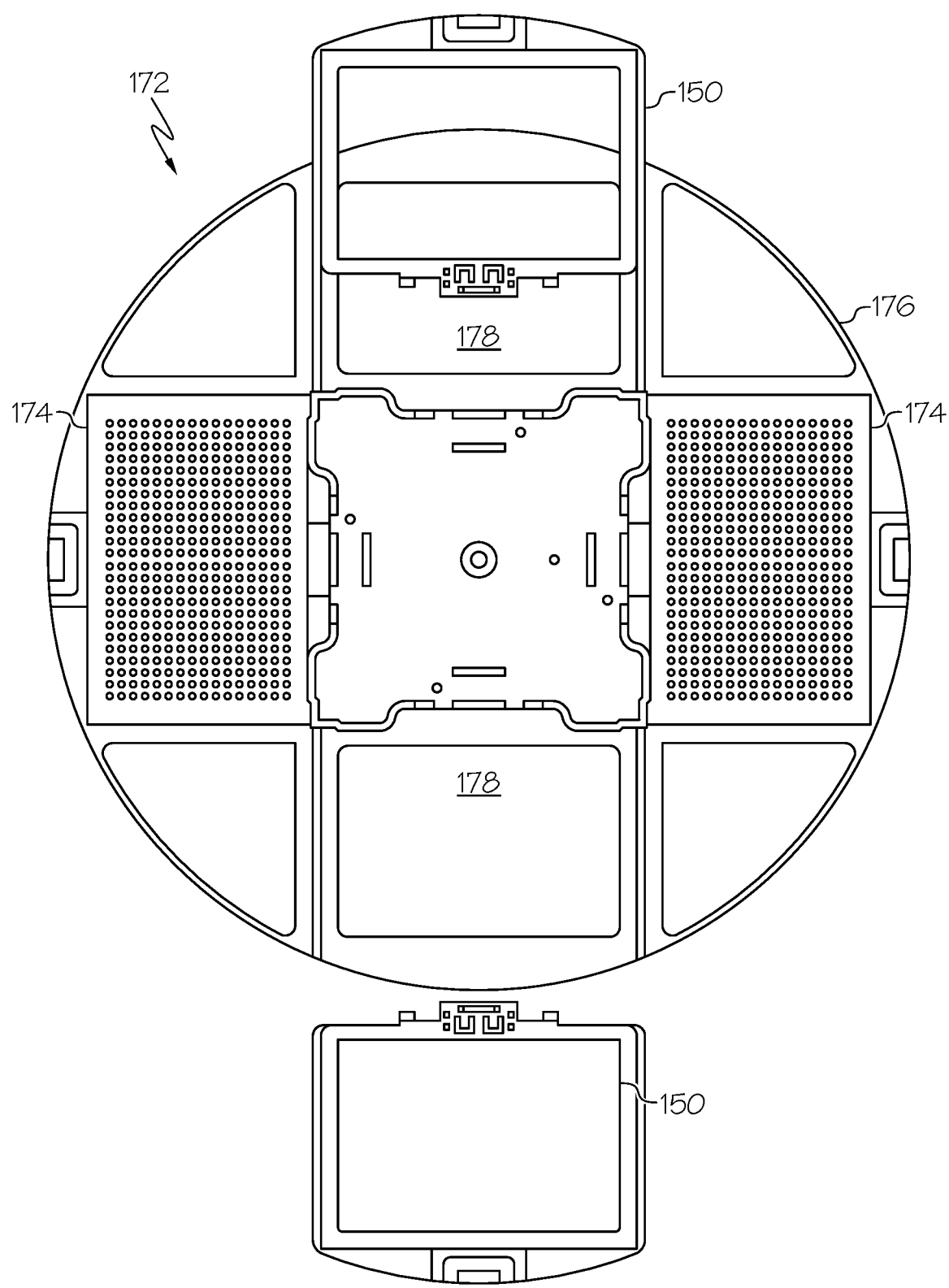
FIG. 6 is a top down view of an alternative example of a sample tray.

FIG. 6 is a top down view of an alternative example of a sample tray 172 which includes four compartments 178 each for holding a transfer drawer 150. The compartments 178 are disposed with an angular separation of 90° from each neighboring compartments. Two of the compartments 178 are occupied by sample-vial carriers 174 in the corresponding transfer drawers 150, a third compartment 178 at the top of the figure has a partially retracted transfer drawer 150 and the fourth compartment 178 is shown with its transfer drawer 150 fully removed. The base 112 is sized to encircle the remainder of the sample tray 172 when all four transfer drawers 150 are fully inserted into their compartments 178. The sample tray 172 may be substantially larger than the sample tray 101 shown in FIG. 3 to accommodate the additional compartments 178 and sample-vial carriers 174. In this configuration, the sample tray 172 can be moved in 90° increments to allow access to any one of the compartments 178. In still other alternative examples, the sample tray may include three compartments and transfer drawers or five or more compartments and transfer drawers. The dimensions of the compartments and transfer drawers may vary according to the number of compartment and drawers, and according to the size of the sample-vial carriers.

Figure 7A:
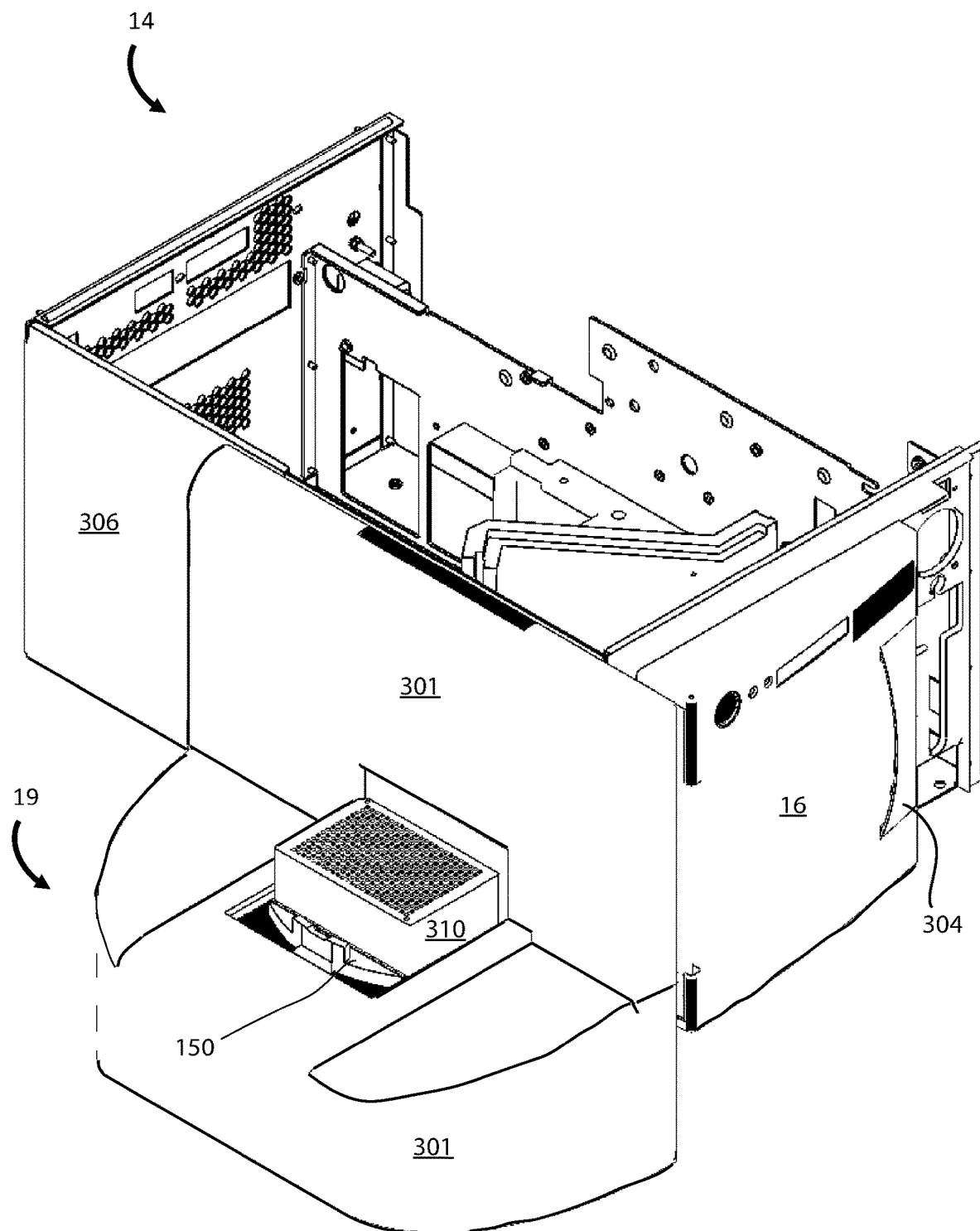
FIG. 7A is a perspective view of the sample manager and the interface module.
Figure 7B:
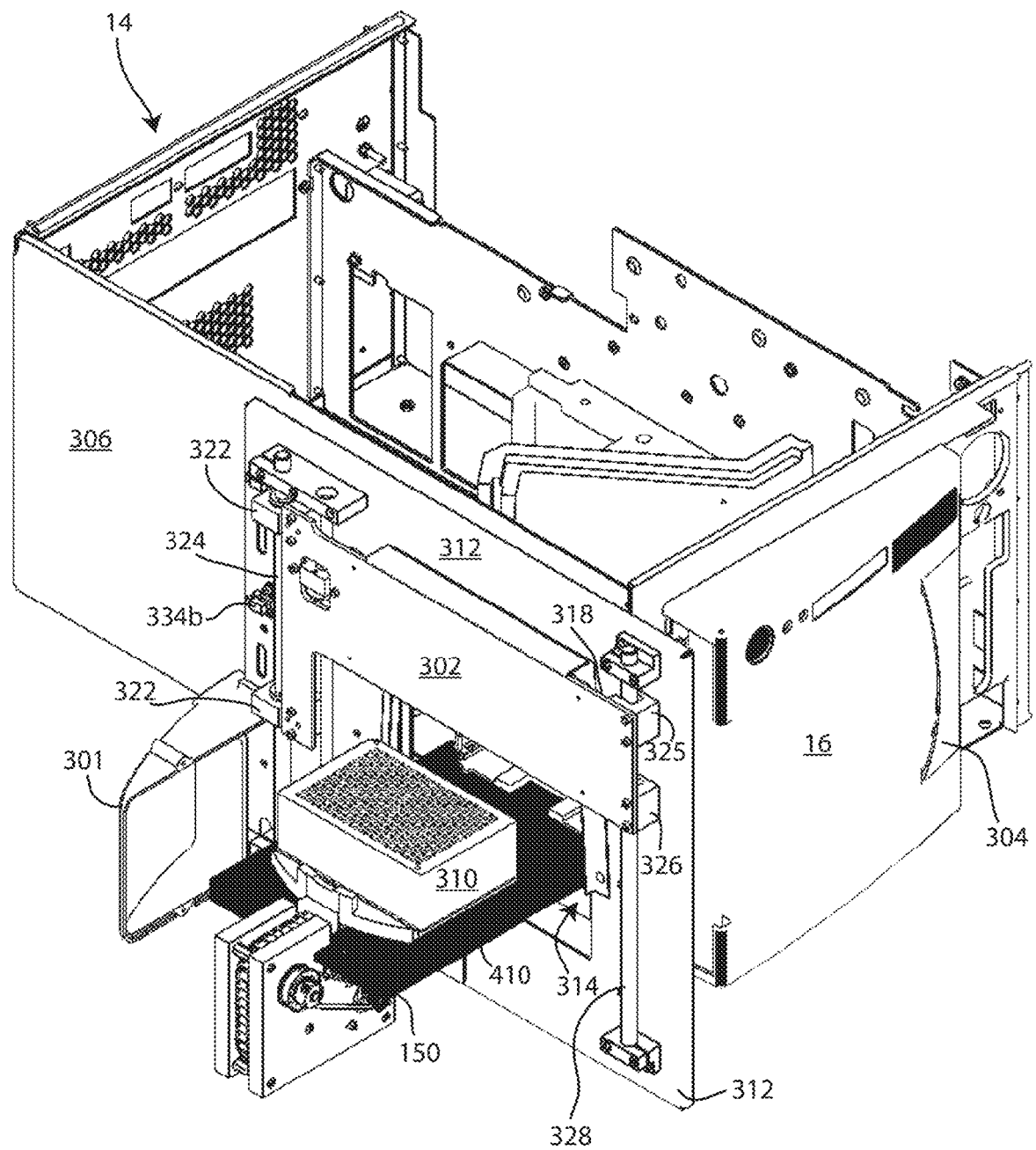
FIG. 7B is the view of the sample manager and the interface module of FIG. 6A with a portion of a housing of the interface module removed.

FIG. 7A is a perspective view of the sample manager 14 and the interface module 19. A portion of the housing surrounding the internal components of the sample manager 14 is removed to permit viewing of the internal environment defined by the housing. FIG. 7B is a view similar to that shown in FIG. 7A; however, a portion of a housing 301 that encloses components of the interface module 19 is removed to permit viewing of internal components. The transfer drawer 150 is shown in a position awaiting transfer of a sample-vial carrier 310 into the sample manger 14 or awaiting removal of the sample-vial carrier 310 from the transfer drawer 150 such as part of an unloading process.

The sample manager 14 includes a front access door 16 which may be manually opened by grasping a handle 304 and pulling to permit a user to access the internal components such as the sample tray 101. This means of access may be used for manual loading and unloading of sample-vial carriers 310. The sample manager 14 further includes a side enclosure panel 306 having an aperture that provides a second means of access to its internal environment, for example, to provide a means for loading and unloading by the robotic system 23.

The interface module 19 includes a transfer drawer receiving apparatus 400 (see FIG. 8) used for loading the sample-vial carrier 310 into the sample manager 14 and for unloading the sample-vial carrier 310 from the sample manager 14. The loading and unloading processes may be performed using a robotic system 23 such as a system having a robotic arm to provide the sample-vial carrier 310 to the transfer drawer 150 and to remove the sample-vial carrier 310 from the transfer drawer 150. Alternatively, a user can manually load and unload sample-vial carriers 310 using the interface module 19 or using the access door 16 at the front of the sample manager 14 for direct access to the sample tray 101.

The interface module 19 includes a plate 312 that may be secured or otherwise mounted to the side enclosure panel 306 of the sample manager 14 using bolts, screws or the like. The plate 312 may have a thermally-insulating material, such as a conformable foam, attached to the side of the plate 312 nearest the side enclosure panel 306. The plate 312 includes a plate aperture 314 that is nominally aligned with the aperture (not visible) in the side enclosure panel 306 of the sample manager 14. In addition, the transfer drawer receiving apparatus 400 includes a device track 410 along which the transfer drawer 150 moves into and out from the sample manager 14. The device track 410 may be attached near or at one end to one or more internal structures inside the sample manager 14.

The interface module 19 further includes a window mechanism having a window that can be controlled to be in an open state and a closed state. As used herein, "window" means a blockable aperture, or blockable opening, in a structure (e.g., the plate 312). The sample-vial carrier 310 can pass through the window when the window is in an open state. The window prevents passage of the sample-vial carrier 310 and environmentally seals the sample manager 14 when the window is in a closed state.

Referring back to FIG. 5B, the sample tray 101 may include a built-in leak management system which may be configured to account for spillage and waste management of samples or fluids within the sample manager 14. Thus, the sample tray 101 may be designed in a manner such that any fluidic leaks will travel along the bottom of the tray to one or more waste port(s). The leak paths may be solvent resistant in order to prevent damage within the sample manager 14. Additionally, spillage may occur outside the sample manager 14 at the interface module 19. The interface module 19 may include a leak management system that leverages the leak management waste port within the sample manager 14 in the sample tray 101. Particularly, the interface module 19 include a channel, crevasse, indentation, or fluidic path along a solvent resistant surface that transfers a leak or spill from the interface module 19 to the sample tray 101 within the sample manager 14. The leak or spill may then be transferred from the interface module 19 to the one or more waste portals of the sample tray 101. This may obviate the need for the interface module 19 from requiring its own leak management port (and associated tubing) therein. However, it is also contemplated that the interface module 19 could be configured with its own secondary leak management portal that is additional to the one or more waste port(s) within the sample tray 101 and/or sample manager 14. Further, such a leak management system within the interface module 19 may protect any electronics within the interface module 19.

Figure 8A:
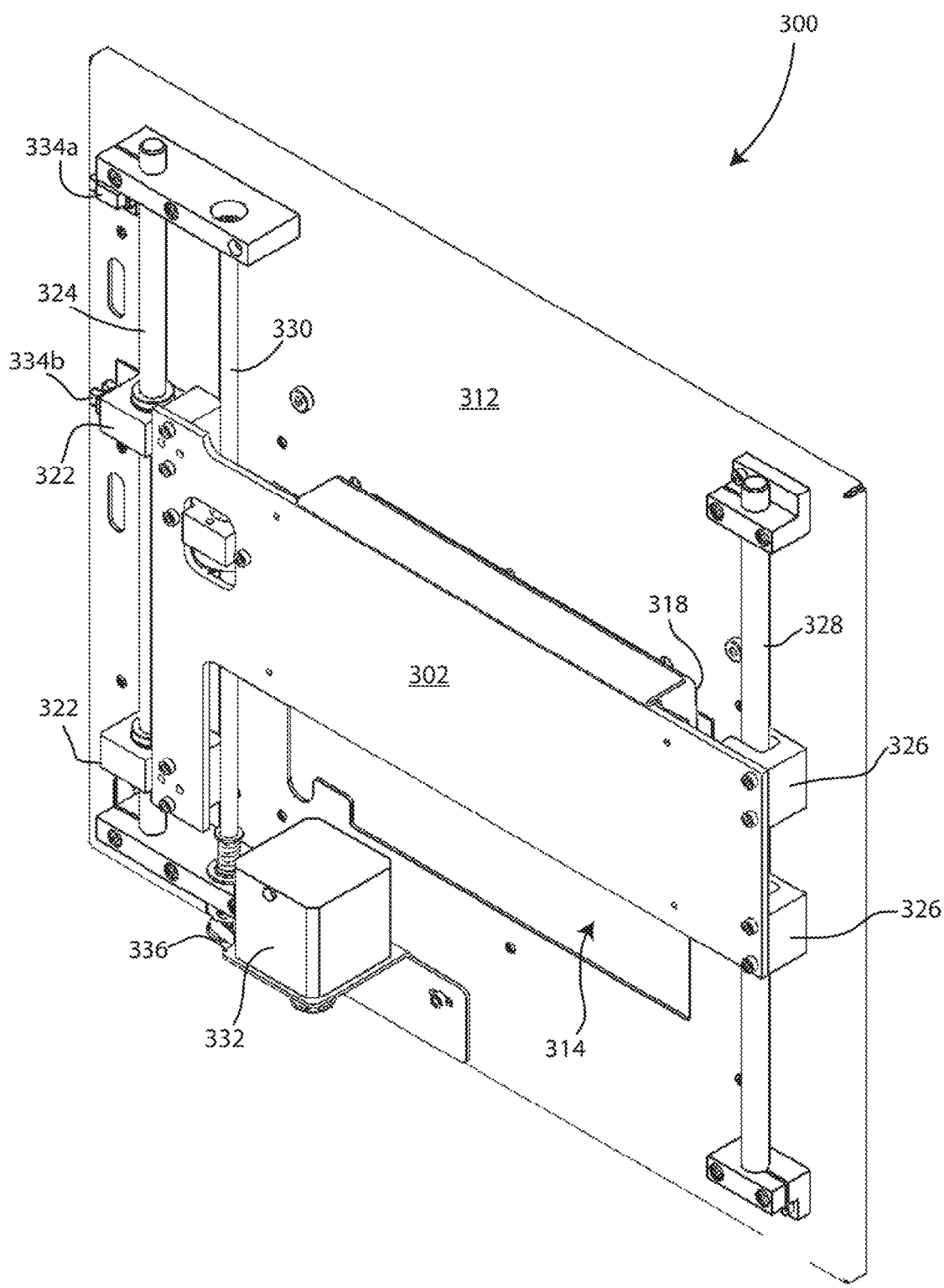
FIG. 8A is a perspective view of a window mechanism with the window in the closed state.
Figure 8B:
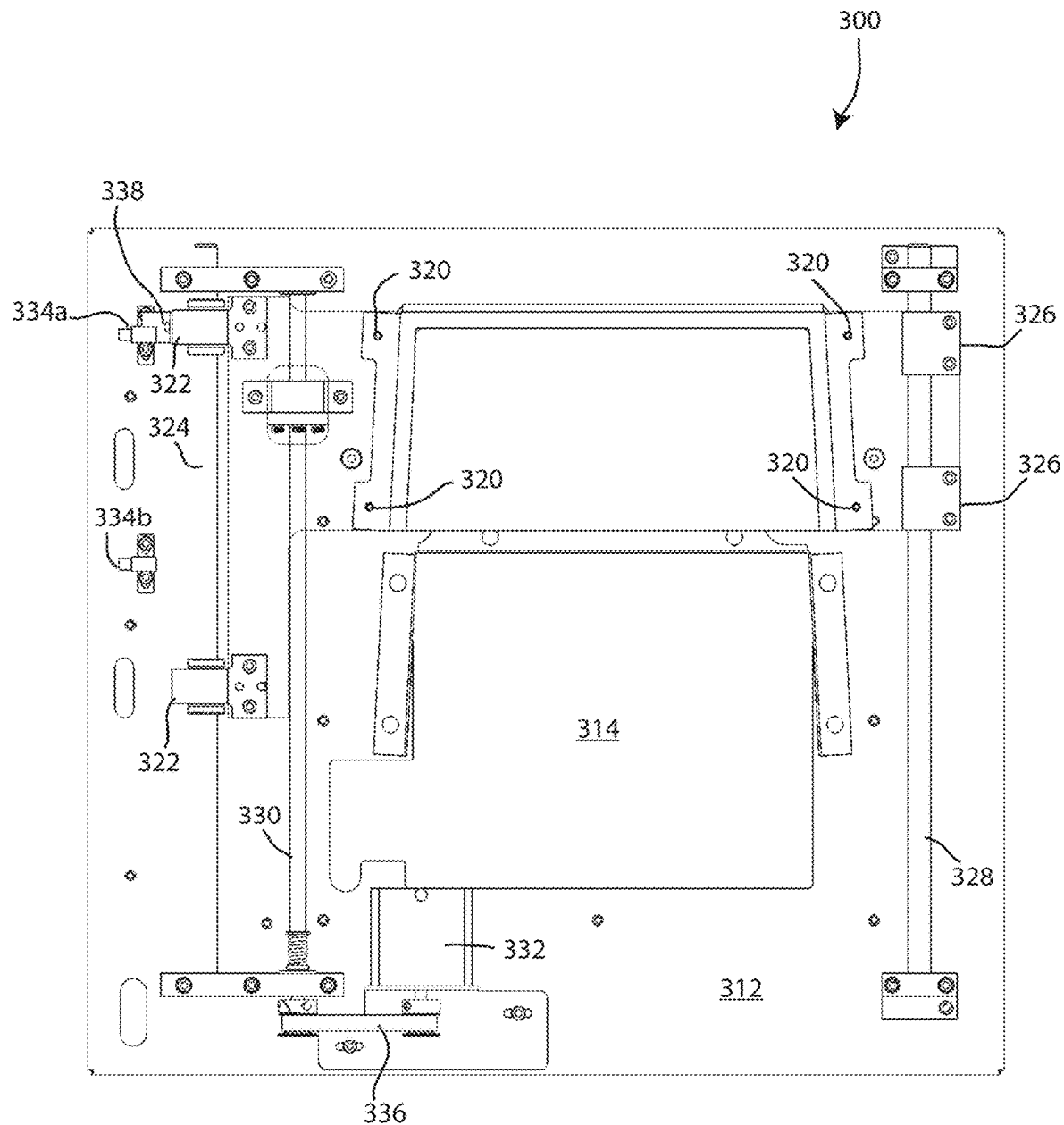
FIG. 8B is the window mechanism of FIG. 7A with the window in the open state.

FIG. 8A show a perspective view of the window mechanism 300 with the window in the closed state and FIG. 8B shows a view of the window mechanism with the window in the open state. A bracket 302 and a window panel 318 visible in FIG. 8A are not shown in FIG. 8B to permit viewing of components that would otherwise be obscured. An aperture 314 in the plate 312 is aligned to the aperture in the side panel 306 of the housing of the sample manager 14. When the window is in a closed state, foam or another conformable sealing material engages an outer surface of the side enclosure panel 306, at least around the aperture in the side panel 306 and the device track 410 (described below, to seal the sample manager 14 and facilitate thermal control of the internal environment of the sample manager 14. Although a bottom portion of the aperture 314 in the plate 312 is shown as unobstructed in the closed state according to FIG. 8A, other components of the interface module 19, such as the device track 410 in the transfer drawer receiving apparatus, are not shown in the drawing but occupy the lower portion of the aperture 314 so that the aperture 314 is fully obstructed. The window is put into the open state to enable transport of the transfer drawer 150 into and out from the sample manager 14 through the aperture in the side enclosure panel 306 during loading of the sample-vial carrier 310 into the sample tray 101 and during unloading of the sample-vial carrier 310 from the sample tray 101. The window is preferably maintained in the closed state at other times to reduce or minimize the exposure of the internal environment of the sample manager 14 to the ambient environment.

In the illustrated implementation, the bracket 302 can be moved upward to open the window and to move downward to close the window. A window panel 318, e.g., a thin sheet metal plate, is attached to the bracket 302 and is the element that blocks and seals the aperture in the sample manager side enclosure panel 306. Referring to FIG. 8B, the window panel 318 is not shown; however, the attachment points 320 (e.g., bolt holes) where the window panel 318 attaches to the bracket 302 are visible. The side of the window panel 318 that faces the sample manager 14 is preferably covered with a foam or other thermally-insulating material. In addition, the perimeter of the window panel 318 that comes into contact with the side enclosure panel 306 preferably includes a thermally-insulating conformable material to seal around the perimeter of the aperture in the panel 306. In some implementations, the thermally-insulating materials are the same material.

The bracket 302 is attached on one side via bushings 322 to a first vertical post 324. At the other side of the bracket 302, a pair of guides 326 engage a second vertical guide post 328 to maintain the bracket 302 parallel to the back plate 312. The bracket 302 is driven vertically upward or downward through rotation of a lead screw 330 that is driven by a rotary motor (e.g., stepper motor) 332 and belt 336. Two optical sensors 334a and 334b are attached to the plate 312. The first optical sensor 334a is blocked by an "optical flag" 338 when the bracket 302 moves upward to a position at which the window is unobscured, i.e., in the open state to permit loading and unloading operations. The second optical sensor 334b is blocked by the optical flag 338 when the bracket 302 moves downward to a position at which the window is in the closed state. In an alternative example, the optical sensors 334 are omitted and an indexer tracks the rotation of a stepper motor to determine when the window is in the open state or the closed state.

Figure 9:
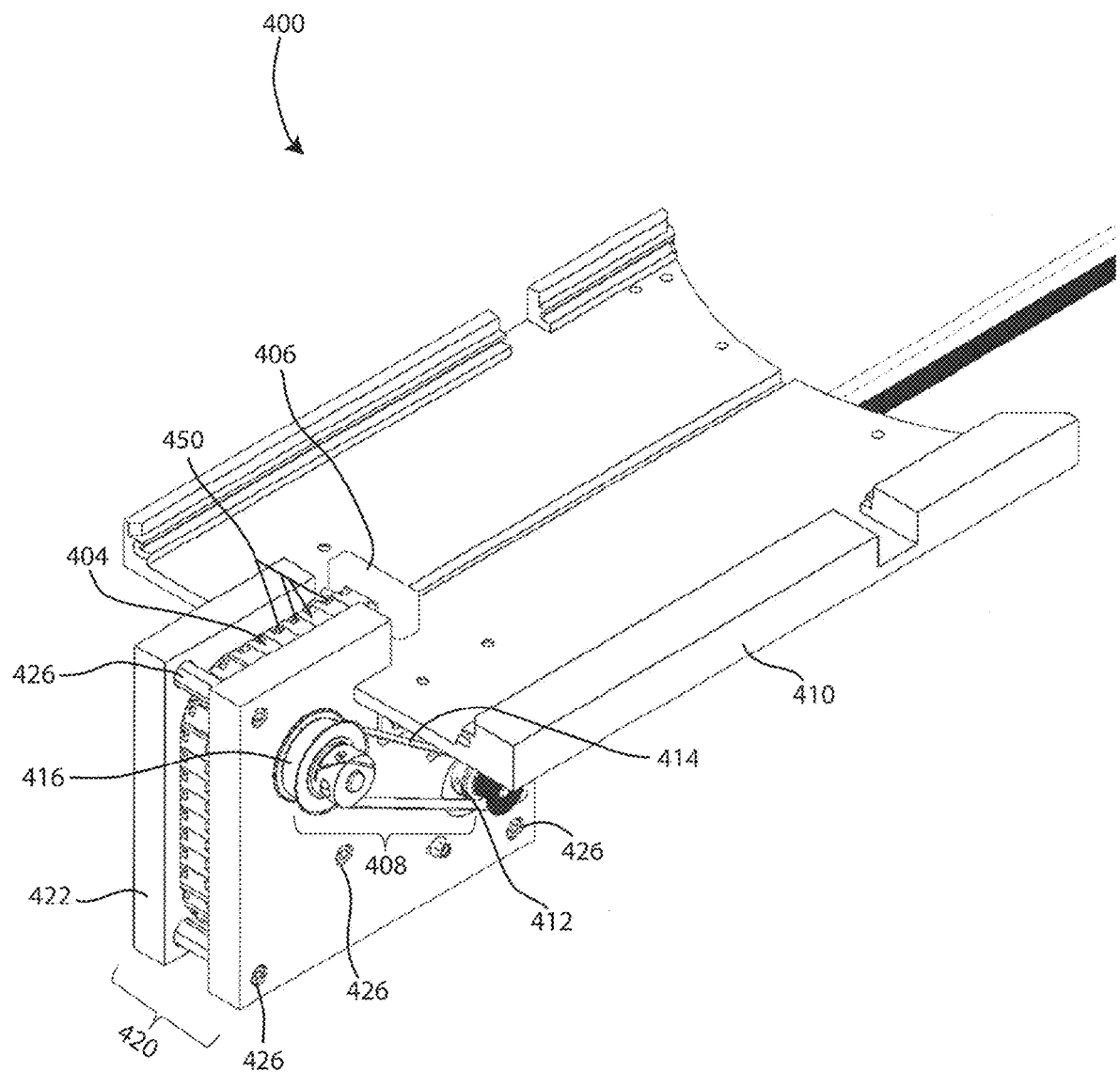
FIG. 9 is a perspective view of a transfer drawer receiving apparatus.

Referring now to FIG. 9, a perspective view is shown of the transfer drawer receiving apparatus 400 including a chain system 402 having a chain 404, a drive magnet 406, and a chain drive system 408 configured to move the chain 404 in a direction parallel to the device track 410. The chain system 402 is housed within the housing 310 of the interface module 19, which has been removed in the view shown in FIG. 9. The chain system 402 is configured to push and/or pull transfer drawers 150 along the device track 410.

While the description of the chain system 402 hereinafter will focus on one specific implementation of a chain and accompanying drive and attachment systems or mechanisms, some or all of the various features of the chain system 402, the chain 404, the drive magnet 406, and/or the chain drive system 408 may be incorporated into various embodiments and various implementations. For example, rather than a liquid chromatography system, the chain 404, with or without the drive magnet 406 and/or drive system 408, may be utilized in various other laboratory systems, testing systems, assembly systems, pick and place systems, dispensing systems, or various other automated, robotic or manual machines, devices or systems.

Thus, embodiments of the present invention include a one-way bending chain that is precluded from back bending, incorporating the link structure described herein. Other embodiments of the present invention include a magnet attached to a push-pull drive chain incorporating the described link and chain structure. Still other embodiments include a chain having links with a post that is exposed from an inner side of a chain configured to receive teeth of a drive gear. Still further, embodiments of the invention may include a one-way bending chain that is precluded from back bending, incorporating links having an integral plastic body structure, without requiring separable pins and link bodies. Embodiments of the invention may include a one-way bending chain that is precluded from back bending but allows for 90-degree bending between two adjacent links by, for example, utilizing the link structure described herein.

Other embodiments of the invention include using a chain system, including some or all of the structure described herein, for an interface module, such as the interface module 19, that is configured to load and unload sample trays or samples, for a sample managing system used for chromatography, liquid chromatography, or any other sample analysis system. For example, embodiments of the invention may include utilizing a one-way bending chain that is precluded from back bending, in combination with a chain drive system, to push and pull transfer drawers having samples into and out of an analytical chamber, such as the liquid chromatography sample manager 14.

Figure 11:
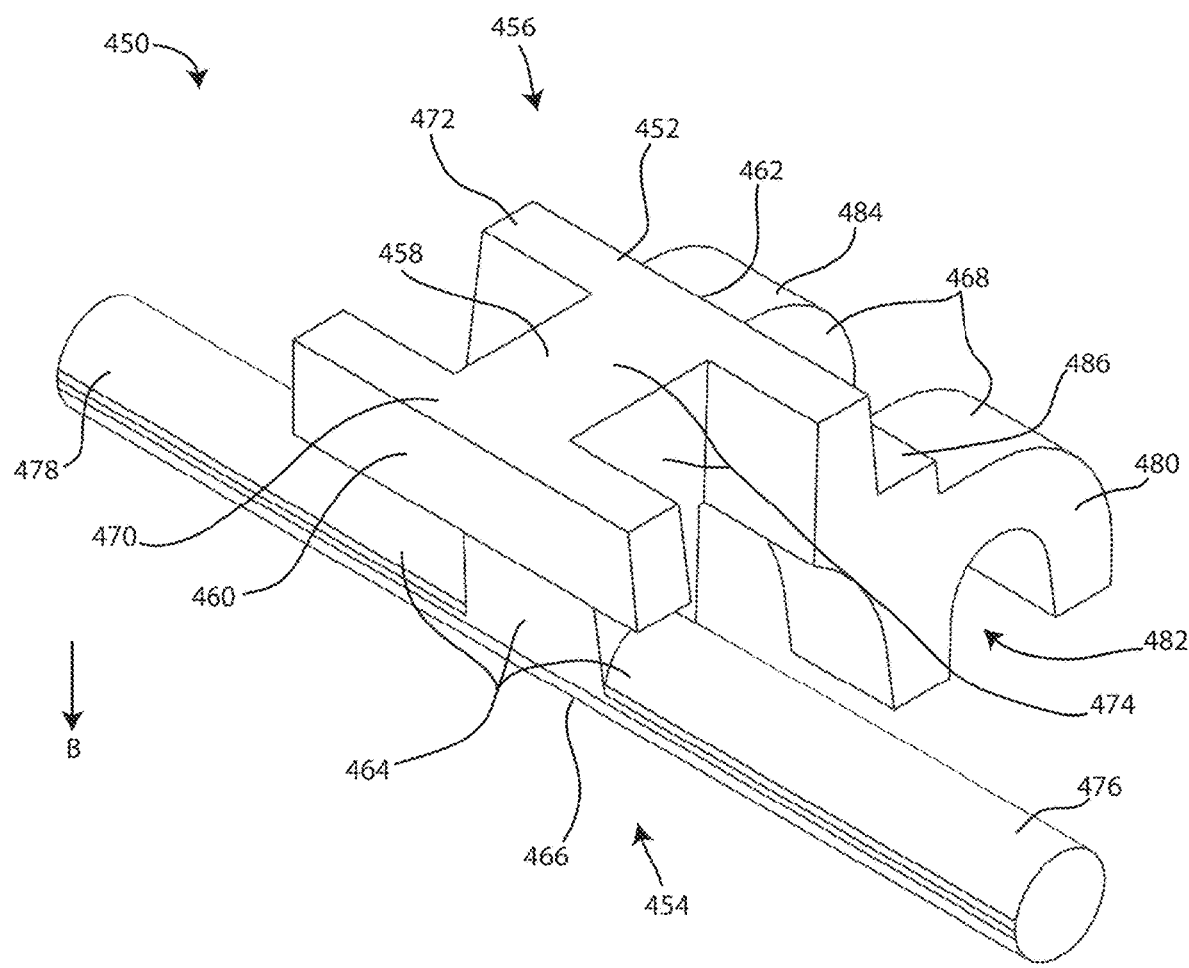
FIG. 11 depicts a perspective view of a link of the chain in the chain system shown in FIGS. 8A to 9B.

Referring still to FIG. 9, the chain 404 includes a plurality of links 450 that are attached, coupled, or otherwise connected such that the chain 404 is configured to bend in a first direction without back bending in an opposite direction from the first direction. Each of the links 450 of the chain 404 may include the same structure, as shown in FIG. 11 and described herein below.

The chain 404 is shown driven by the chain drive system 408 that comprises a stepper motor 412 that turns a drive belt 414 to rotate a drive gear 416. The drive gear 416 is shown having a larger radius than the stepper motor 412, which may be desirable to increase precision of movement translated from the stepper motor 412 by the drive gear 416 to the chain 404. However, other embodiments are contemplated in which the radius of the drive belt 414 at the stepper motor 412 is the same or larger than the radius of the drive belt 414 at the drive gear 416.

In other embodiments (not shown), the chain 404 may be driven by a direct drive system, rather than the drive system shown, which requires the drive belt 414 to rotate the drive gear 416. In such a direct drive system, the drive belt 414 and gear 416 may not be necessary. Instead, the motor may turn an output shaft that is directly interfaces with the chain 404 for movement thereof. Thus, the invention is not limited to the specific drive mechanism shown, and other mechanisms for moving the chain 404 are contemplated.

The stepper motor 412 may provide for precise movement of the chain 404. The stepper motor 412 may be one of various forms of stepper motors, such as a unipolar motor, a bipolar motor, or the like. The stepper motor 412 may be configured to rotate both clockwise and counterclockwise in order to create rotation on the gear drive 416 and extend or retract the chain 404. The stepper motor 412 may include an indexer or other microprocessor for controlling movement, along with a driver for converting indexer signals to power. While the stepper motor 412 may provide for movement of the chain 404 in a manner that does not require additional position sensors or feedback in order to verify the accuracy or position of the chain 404 and/or drive magnet 406 that is attached thereto, position or movements sensors may be provided to monitor the chain drive system 408. While the stepper motor 412 may be one embodiment contemplated for driving the chain 404, other types of motors, systems, or the like are contemplated, such as servo motors, brushless DC motors, or the like.

The chain system 400 is further shown having a drive system body 420 including a first plate 422 and a second plate 424. A plurality of male-female spacers 426 are shown connecting and spacing apart the first plate 422 and the second plate 424. The male-female spacers 426 are shown comprising an externally threaded male head threaded into an internally threaded female hexagonal spacer post. The drive system body 420 may be configured to house and protect the chain 404 and guide the movement of the chain 404 created through the stepper motor 412. It should be understood that the drive system body 420 is one example of a housing for accomplishing this functionality and that other housings are contemplated. For example, the chain 404 may be fully enclosed by the drive system body 420 rather than being spaced apart by the plurality of male-female spacers 426.

Figure 10A:
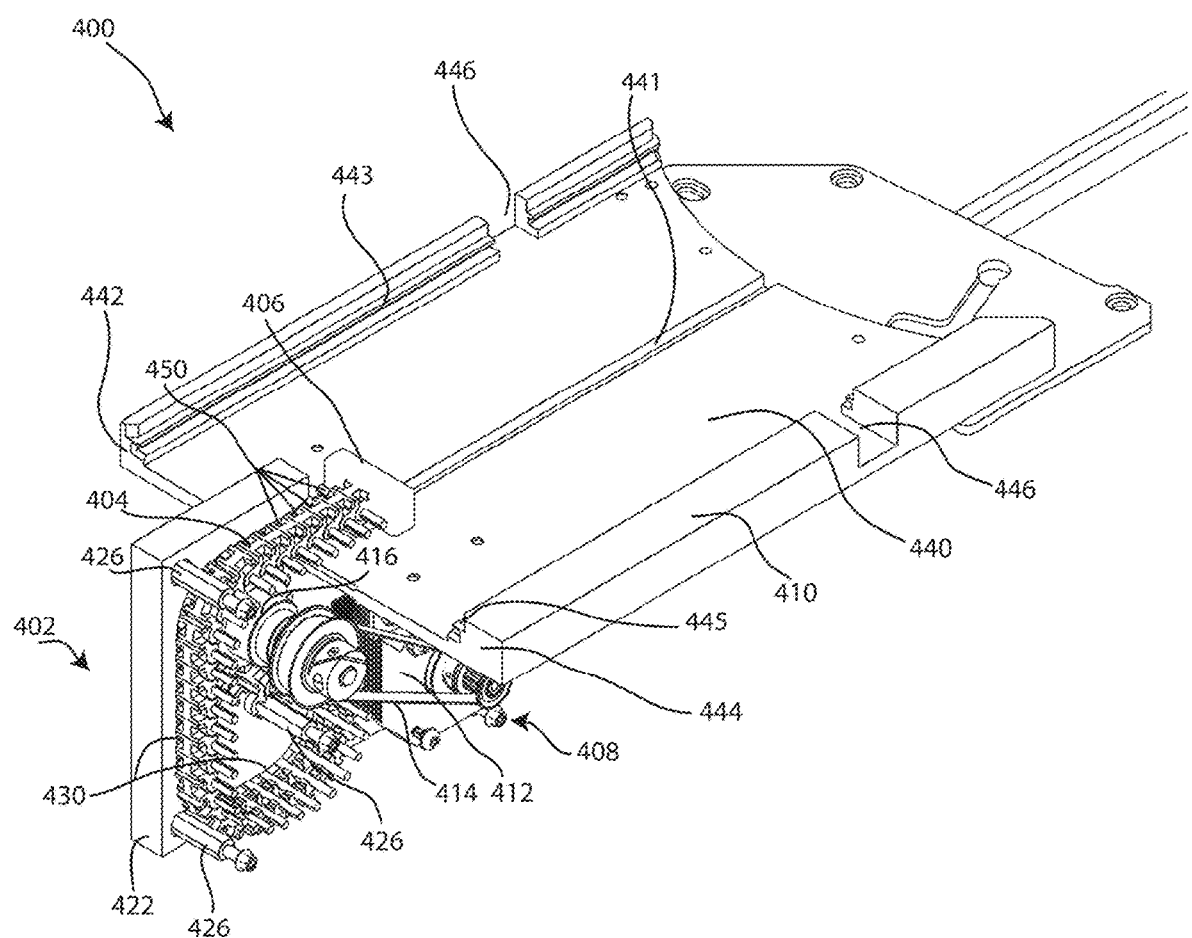
FIG. 10A a perspective view of the chain system and the device track of the transfer drawer shown in FIG. 8 with a portion of the drive system body removed.

FIG. 10A depicts a perspective view of the chain system 400 and the device track 410 of FIG. 9, with a portion of the drive system body 420 removed in accordance with one embodiment. The second plate 424 of the drive system body 420 is removed in FIG. 10A, in order to reveal the stepper motor 412, the drive belt 414 and the drive gear 416 of the chain drive system 408, along with the male-female spacers 426. As shown in FIG. 10A, the first plate 422 of the drive system body 420 includes an inner track 430 configured to guide the chain 404 during movement by the chain drive system 408 from a retracted position shown, to an extended position (not shown) where the chain 404 extends along the device track 410. The inner track 430 accommodates the entire length of the chain 404 in its retracted position, as shown. The left and right sides of the chain 404, and the posts extending therefrom may be housed within the inner track 430. While the inner track 430 of the first plate 422 is shown, it should be understood that the second plate 424 includes a corresponding inner track for receiving the side of the chain 404 (and the posts thereof) that is exposed in FIG. 10.

As shown, the inner track 430 may be curved in one direction to accommodate the chain 404 that is configured to bend in one direction without back-bending. The inner track 430 is shown curving around the drive gear 416. The inner track 430 may be dimensioned to be slightly larger than the chain 404 itself so that the chain 404 slides easily within the inner track 430 with only the sliding friction between the material of each. The inner track 430 and/or chain 404 may include lubrication or other friction reducing mechanism to provide for ease of extension and retraction of the chain 404 therein.

The gear drive 416 may be configured to rotate when the belt 414 is moved by the rotating stepper motor 412. The gear drive 416 may be configured to integrate with a post feature (described more specifically herein below and shown in FIG. 11) of each of the links 450 of the chain 404. The gear drive 416 may include a gear having teeth which extend into the inner track 430 of the drive system body 420 to provide for meshing or otherwise coupling between the gear drive 416 and the chain 404. The teeth of the gear drive 416 may extend into the inner track 430 at a curved portion that curves around the circular profile of the gear drive 416 to allow an increased length of the chain 404 to be enmeshed with the gear drive 416 relative to another embodiment having a gear drive that extends into a straight portion of the track.

The device track 410 includes a track base 440 having a base channel 441, a left wall 442 having a left channel 443, and a right wall 444 having a right channel 445. The left wall 442 and the right wall 444 each include a spacing, opening, or removed section 446 configured to receive the access door 16 described hereinabove. The channels 441, 443, 445 and dimensions of the device track 410 may be keyed to the particular dimensions and corresponding protrusions of the transfer drawers 150 described hereinabove. However, in other embodiments, the device track 410 may include any dimensions and/or channels or extending protrusions appropriate to move whatever device requires pushing and pulling with the chain system 400.

Figure 10B:
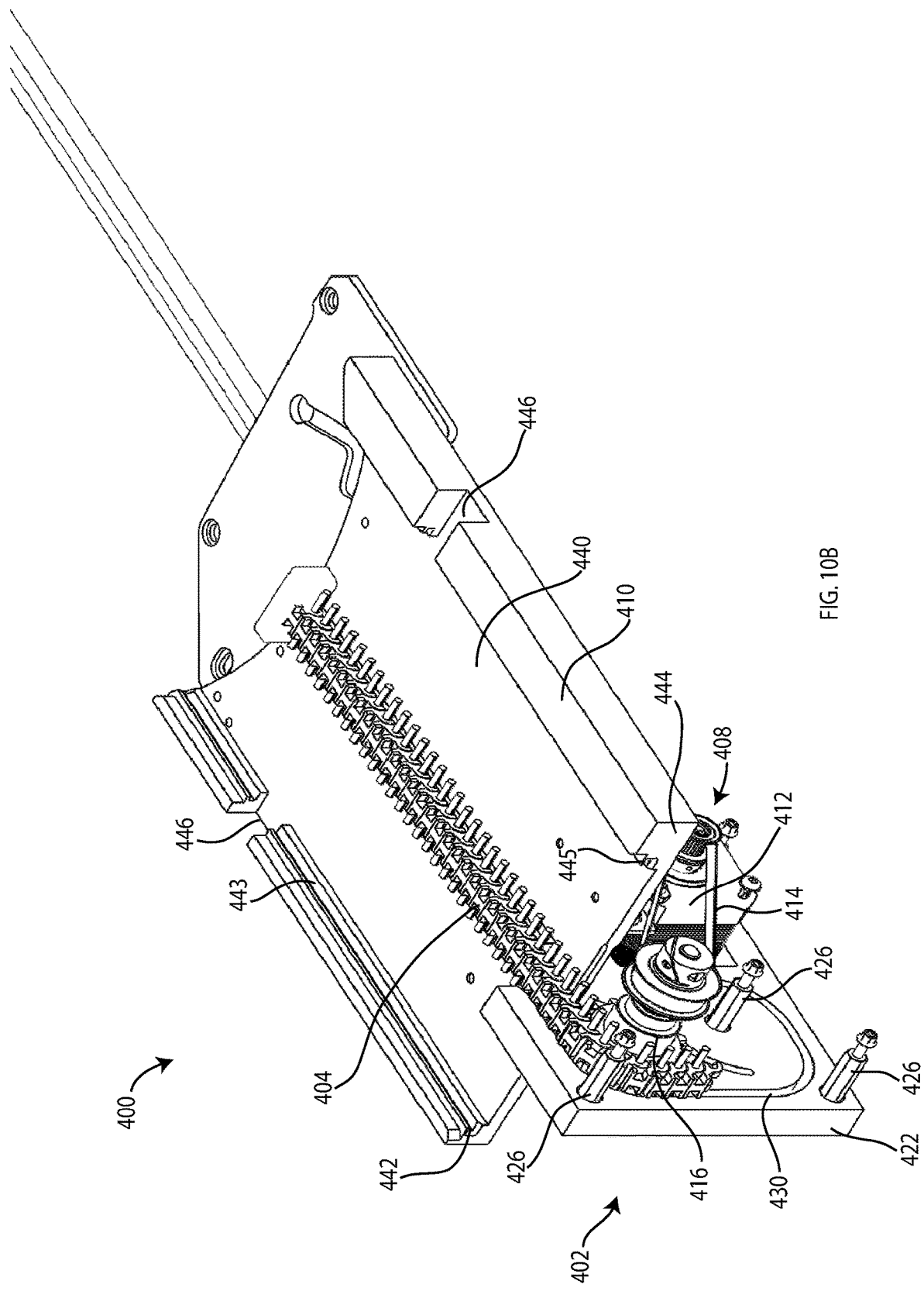
FIG. 10B is a perspective view of the chain system and the device track of FIG. 8 with the chain in an extended position.

FIG. 10B depicts a perspective view of the chain system 400 and the device track 410 of FIG. 9, having the chain 404 in an extended position, in accordance with one embodiment. When in the retracted position shown in FIG. 10A, the stepper motor 412 may be rotated, causing the belt 414 to exact rotation on the gear drive 416 which is meshed with one or more exposed post features of the links of the chain to drive the chain forward along the inner track 430 and out of the drive system body 420. When a transfer drawer 150 is magnetically attached to the drive magnet 406, this extraction or extension of the chain 404 by the chain drive system 408, is configured to move the transfer drawer 150 along the device track 410. Thus, the chain drive system 408 may be configured to apply enough force on the chain 404 to overcome the static and/or sliding friction between the transfer drawer 150 and the device track 410. As shown, the chain 404 may be long enough such that at least a portion of the back end of the chain 404 may remain in the inner track 430 of the drive system body 420 when the chain 404 is in the extended state. This may facilitate retraction of the chain 404 back into the drive system body 420.

In one embodiment, the chain 404 may remain in the retracted state (shown in FIG. 10A) by default. This may allow for the transfer drawer 150 to be placed onto the device track 410 manually, or by a robotic or automated system. Once the transfer drawer 150 is placed in position on the device track 410, extension of the chain 404 may be initiated by the chain drive system 408. This movement may place the drive magnet 406 in magnetic attachment with a magnet of the transfer drawer 150 for subsequent movement of the transfer drawer 150 through the access door 16.

FIG. 11 depicts a perspective view of a link 450 of the chain 430 of the chain system 400 of FIGS. 9 and 10 in accordance with one embodiment. The link 450 represents one of the links of the chain 404. However, the chain 404 may comprise as many of the links 450 in order to provide for a sufficient length for a given application. Each of the links 450 of the chain 404 may have the same structure, shown in FIG. 10 as the link 450a.

Figure 12:
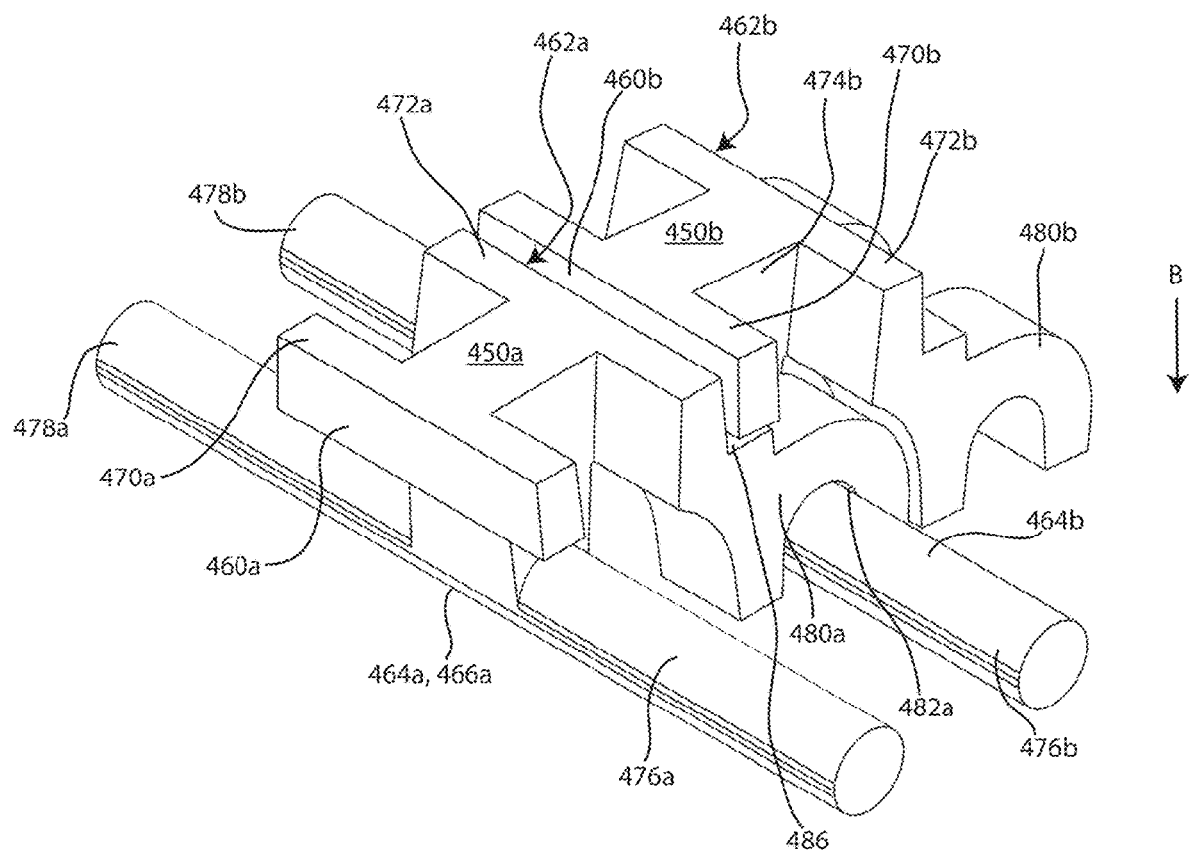
FIG. 12 depicts a perspective view of a first link of the chain coupled to a second link of the chain in an extended, straightened and/or non-bended position.

As shown, the link 450 includes a link body 452 having an inner side 454 facing a bending direction B of the chain 404. The link body 452 further includes an outer side 456 facing opposite the bending direction B of the chain 404. The link body 452 still further includes a back-bending prevention portion 458 proximate the outer side 456 of the link body 452. The back-bending prevention portion 458 includes a first surface 460 and a second surface 462. The first surface 460 is configured to prevent back bending when engaged with the second surface of a first other of the pivotally connected links 450 (as shown in FIG. 12 and described in more detail herein below). The second surface 462 is configured to prevent back-bending when engaged with the first surface of a second other of the pivotally connected links 460. The link body 452 still further includes a post feature 464 extending laterally across the link body 452. The post feature 464 includes a portion 466 exposed from the inner side 454 of the chain 404 when the link 450 is connected or otherwise coupled to adjacent links to form the chain 404. The link body 452 still further includes a connection feature 468 that is configured to engage with the post feature 464 of the first other of the pivotally connected links 450b to create one direction pivotal attachment without back-bending between the links 450.

Referring more specifically to the back-bending prevention portion 458, this portion includes a first flange 470 having the first surface 460 and a second flange 472 having the second surface 462 and a web 474 extending between the first flange 470 and the second flange 472. The first flange 470, the second flange 472 and the web 474 may create an I shaped cross section when viewing the outer side 456 from above. The first surface 460 extends in a plane that is parallel to the axis of the post feature 464 and also parallel to the vertically extending axis defined by the bending direction B. The web 474 creates the middle of the I shape and extends between the first flange 470 and the second flange 472. The web 474 also extends in the vertical bending direction B below the first and second flanges 470, 472 toward the inner side 454 of the chain 404.

The post feature 464 is connected to the web 474 at the inner side 454 of the chain 404. The post feature 464 is shown including a first post portion 476 extending from the web 474 in a first direction, and a second post portion 478 extending from the web 474 in a second direction that is opposite the first direction. The post feature 464 extends between the link body 452 in a direction that is parallel to the plane of the first and second surfaces 460, 462 of the first and second flanges 470, 472. The post feature 464 extends across the link body 452 in direction that is perpendicular to the direction the length of the chain 404 extends.

As shown, the post feature 464 is integrally connected to the web 474. For example, the entirety of the link body 452 may be made of a single material mold. In one embodiment, the link body 452 may be made of molded plastic. In other embodiments, the link body 452 may be made of molded metal. Still other embodiments, the link body 452 may be three dimensionally printed. In still other embodiments, some or all of the features of the link body 452 may be created by attaching, connecting, or otherwise coupling more than one component together. For example, in one contemplated embodiment, the post feature 464 is instead a separate pin component and the web 474 includes at least one opening such that the post feature 464 is insertable through the opening and held in place by interference fit, or with any other attachment means, such as a crimp ring retainer or the like. Various other structural embodiments are contemplated.

Extending from the second flange 472 in the bending direction B below the second flange 472 is the connection feature 468. The connection feature 468 includes a first u-shaped body 480 defining a first channel 482 and a second u-shaped body 484 having a second channel (not shown). The first and second u-shaped bodies 480, 484, and respective channels 482 each comprise the same structural dimension. The post feature 464 of adjacent pivotally connected links are receivable in the first channel and the second channel, as shown more specifically in FIG. 12. Similarly, the web 474 of adjacent pivotally connected links are configured to extend between the first u-shaped body 480 and the second u-shaped body 484. The connection feature 468 still further includes a shelf 486 upon which a lower surface of the first flange 470 of the back-bending prevention portion 458 may rest when two adjacent links are in an extended, straight and/or non-bended position.

FIG. 12 depicts a perspective view of a first link 450a of the chain 430 coupled to a second link 450b of the chain 404 in an extended, straightened and/or non-bended position accordance with one embodiment. The first and second links 450a, 450b are each shown as including the same structure and dimensions as the link 450 of FIG. 11. As shown, the post feature 464b of the second link 450b is coupled to the connection feature 468a of the first link 450a. In particular, each of the channels 482a of the u-shaped bodies 480a of the first link 450a are shown having received the post feature 464b of the second link 450b. While hidden by the body of the first link 450a, the web 474b of the second link 450b extends through the opening between the two connection features 468a of the first link 450a. In the extended position shown, the first flange 470b of the second link 450b is almost resting on the shelf 486a of the first link 450a. Still further, the first surface 460b of the second link 450b is shown adjacent and proximate the second surface 462a of the first link 450a. Because a narrow gap exists between the surfaces 462a, 460b of the first and second links 450a, 450b, the chain 404 is not fully extended and is very slightly bent. When the narrow gap closes completely, the first and second links 450a, 450b become fully extended and are stopped or otherwise prevented from back-bending by the contact between the surfaces 462a, 460b and/or the contact with the first flange 470b of the second link 450b with the shelf 486a of the first link 450a.

Figure 13:
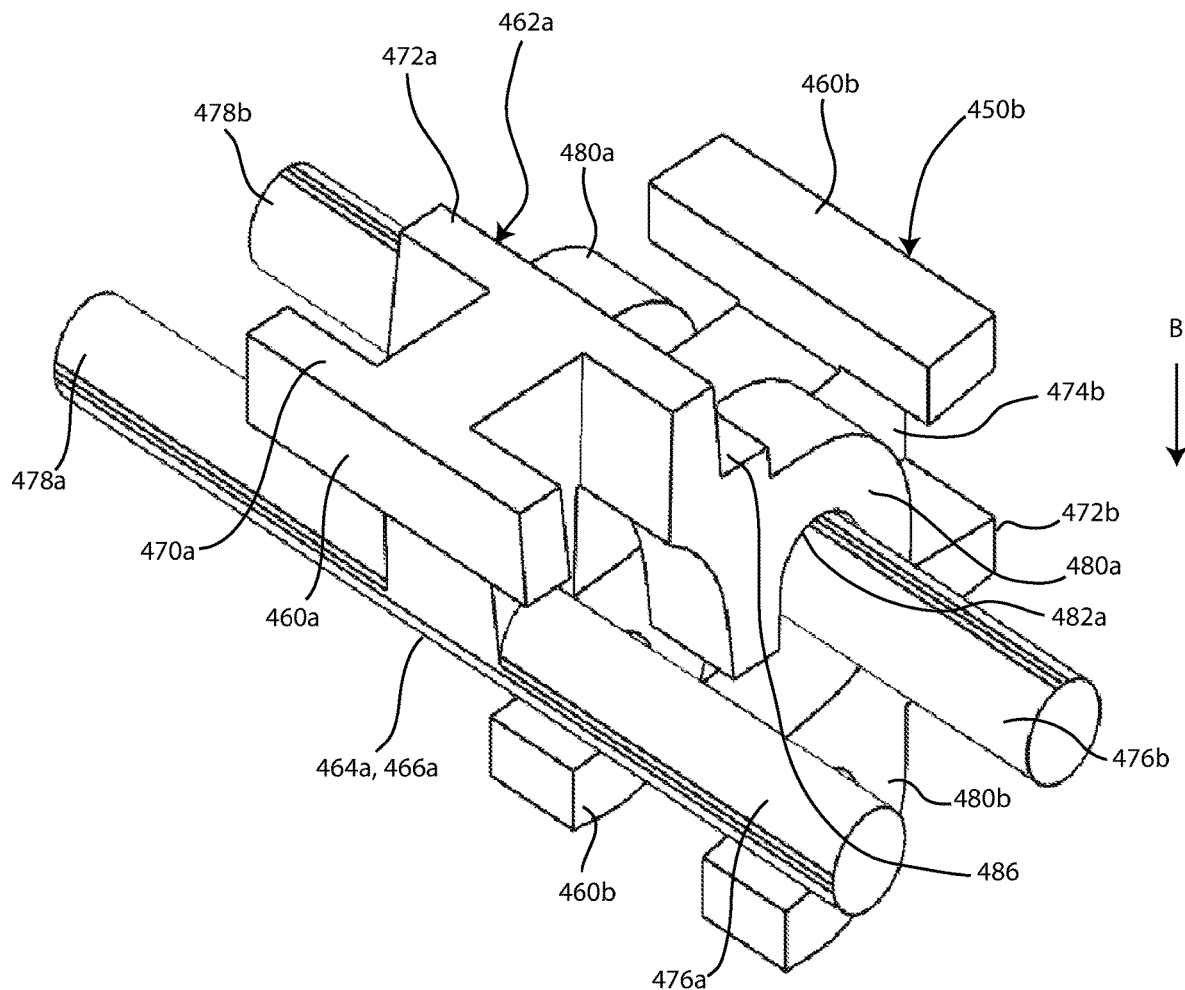
FIG. 13 depicts a perspective view of the chain in a bent position.

FIG. 13 depicts a perspective view of the chain 430 in a bent position, in accordance with one embodiment. As shown, the chain 430 includes a 90-degree bend between two adjacent links 450a, 450b. FIG. 13 shows that the structure of the links 450a, 450b provide a coupling that allows for 90-degree bending without separation or decoupling. This 90-degree maximum bent state provided for by the structure of the two adjacent links 450a, 450b allows for the chain 404 to have a maximum amount of inward flexibility in the bending direction B. In some embodiments, the maximum bending may be less than 90 degrees while maintaining attachment of adjacent links 450a, 450b.

Methods of pushing and/or pulling a device with a chain are also contemplated. For example, a method may include providing a chain, such as the chain 404, including a plurality of links, such as the links 450, pivotally connected to each other such that the chain is configured to bend in one direction without back-bending. The chain includes a magnet, such as the drive magnet 406, attached to a front link of the plurality of links. The method may include connecting the magnet to a magnetic feature of a device, such as the transfer drawer 150. The method further may include pushing the device with the chain in a first direction by driving the chain with a drive system, such as the drive system 408, that includes a rotating gear drive, such as the gear drive 416 in operable communication with a motor, such as the stepper motor 412. The method may still further include disconnecting the magnet from the magnetic feature of the device.

Methods may further include fashioning a non-back-bending, one way chain that comprises duplicated integral links made of, for example, a molded plastic. Methods may include maintaining attachment between links of a one-way bending chain that is precluded from back bending, when one link is bent up to 90 degrees about another link. Methods may further include utilizing a one-way bending chain that is precluded from back bending chain for automating the loading and unloading of a device into a testing machine. Specifically, methods may include utilizing a one-way bending chain that is precluded from back bending having a magnetic drive feature for loading and unloading transfer drawers configured to hold sample vial carriers into and out of a liquid chromatography system such as a sample manager.

The interface module 19 further includes a processor in communication with the transfer drawer receiving apparatus 400, window apparatus 300 and/or the chain system 402. The processor may be implemented as an electronics control board such as a printed circuit board with electronics components, and/or may be implemented with one or more discrete processing elements such as a microprocessor. The processor controls the functions of the transfer drawer receiving apparatus 400, including controlling the transport of the transfer drawer 150 into and out from the sample tray 101. This may include controlling the stepper motor 412, drive belt 414 and drive gear 416, for example. Similarly, the processor controls the functions of the window apparatus 300, including opening and closing the window. For example, the processor can issue control commands, such as commands to the motors 412 and 332 of the transfer drawer receiving apparatus 400 and window apparatus 300, respectively, in response to signals received from one or more optical sensors, magnetic sensors and the like. Thus, the processor may be in operable communication with one or more various sensor devices disposed as needed within the interface module 19 to assure precision of movement, the timing of opening and closing the window apparatus 300. The processor may be configured to reduce the amount of "open" time to a minimum (i.e. only when the transfer tray is being inserted or removed from the system through the window apparatus 300) to ensure minimal fluctuation in the internal atmospheric conditions within the liquid chromatography system, and the like. In an alternative example, the processor may be implemented as part of a liquid chromatography system processor (e.g., processor 34 in FIG. 1) used to control operation of additional components of a liquid chromatography system, such as operations of valves and pumps. In another alternative example, the processor is in further communication with the robotic system used to provide sample-vial carriers to and/or remove sample-vial carriers from the transfer drawer. In still other embodiments, multiple processors may be utilized—one controlling the chain system 402 and the drive system thereof, and the other controlling the window apparatus 300.

Figure 14:
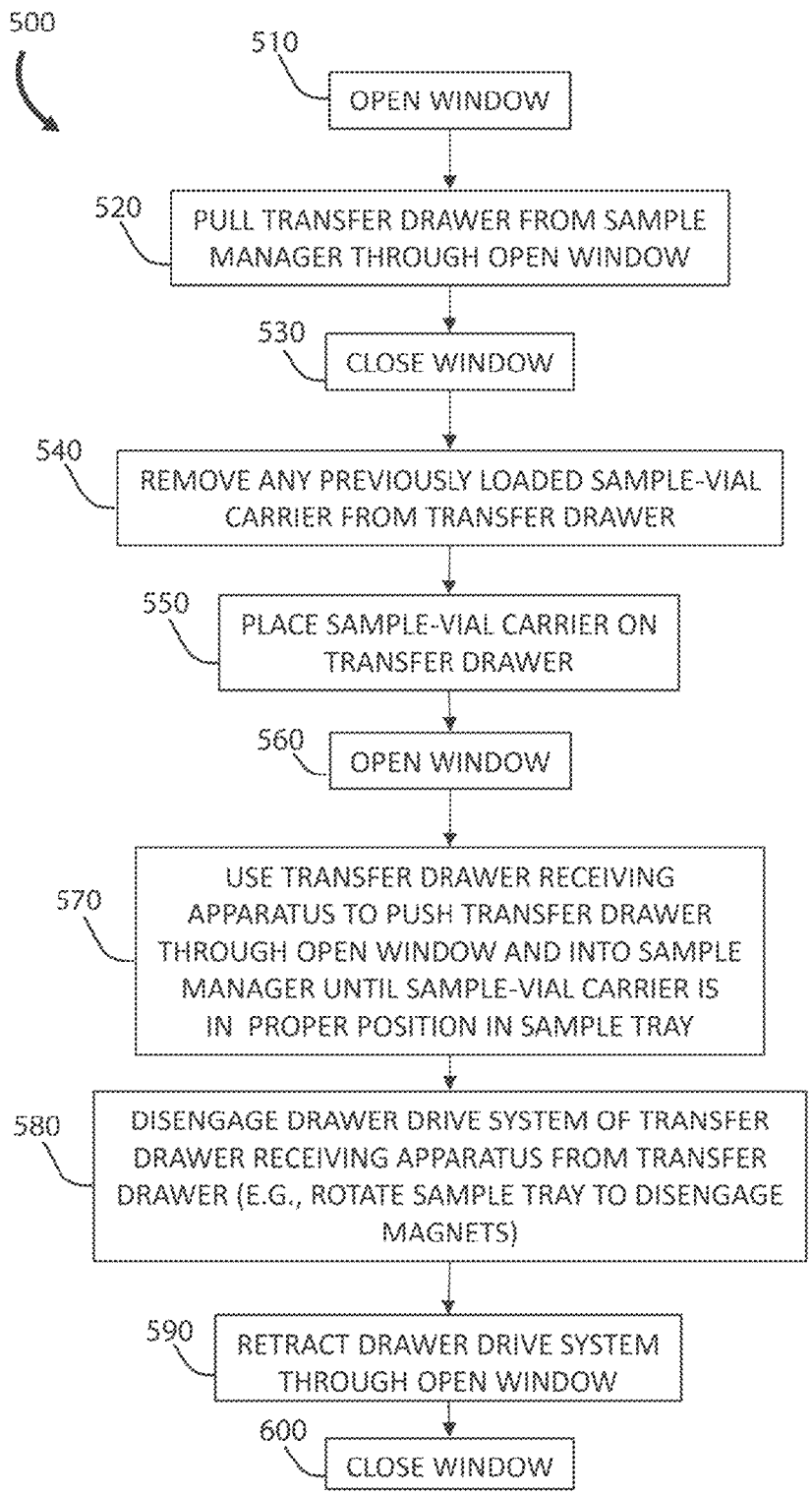
FIG. 14 is a flowchart representation of an example of a method for loading one or more samples into a sample manager of a liquid chromatography system.

FIG. 14 is a flowchart representation of an example of a method 500 for loading one or more samples into a sample manager of a liquid chromatography system. The method 500 includes opening (510) the window of the window apparatus to enable access to the sample tray of the sample manager. Subsequently, the transfer drawer is pulled (520) from the sample tray through the window so that the transfer drawer is externally accessible. The window is then closed (step 530) to maintain an acceptable internal environment for the sample manager. Preferably, the duration when the window is open is no more than a few seconds (e.g., less than three seconds). An acceptable duration may be determined according to the frequency of load and unload operations and according to the time required to move the transfer drawer between its fully inserted position and its fully withdrawn position. For example, the transfer drawer may be made accessible to a programmable arm or other robotic manipulator mechanism. Any previously loaded sample-vial carrier is grasped or otherwise acquired by the robotic arm, removed (step 540) from the transfer drawer and placed in a remote storage location or other location within range of the robotic arm.

The robotic arm moves to a location remote to the liquid chromatography system where one or more sample-vial carriers are stored. For example, the sample-vial carriers may be stored in a sample organizer within reach of the robotic arm and may have multiple shelves each configured to hold a sample-vial carrier. The sample organizer may include a thermally-controlled storage environment. The robotic arm acquires a sample-vial carrier containing one or more sample-vials and moves the sample-vial carrier along a path toward the interface module. The sample-vial carrier is placed (step 550) on the transfer drawer. The window of the transfer window apparatus is opened (step 560) and the transfer drawer receiving apparatus pushes (step 570) the transfer drawer through the open window until the transfer drawer is in the properly loaded position with the sample-vial carrier on the sample tray.

The transfer drawer receiving apparatus is then disengaged (decoupled) (step 580) from the transfer drawer. This is accomplished by decoupling the drive magnet on the chain of the transfer drawer receiving apparatus from the transfer magnet on the transfer drawer. Decoupling is accomplished by rotating the sample tray about its rotation axis so that the resulting shear force between the coupled magnets is enough to overcome the magnetic attraction force between the magnets. For example, the sample tray may be commanded to rotate 90° about the vertical axis 140 shown in FIG. 5B. After the magnets are decoupled, the transfer chain and drive magnet are retracted (590) through the open window to an external position outside the sample manager before the window is closed (step 600). Operation of the sample manager may resume at this time or there may be a delay imposed to allow for the temperature of the internal environment to settle to an acceptable value.

It will be recognized that the certain steps of the method 500 may occur in a different order or may be omitted. For example, the window may remain open for the full duration of the time required to remove a sample-vial carrier from the sample manager and to load the next sample-vial carrier into the sample manager. Moreover, some aspects of the method 500 may be performed simultaneously. For example, two robotic arms may be used: one robotic arm for removing a sample-vial carrier and a second robotic arm to load another sample-vial carrier without the delay otherwise incurred in waiting for a single robotic arm to be available for loading after an unload operation.

While the invention has been shown and described with reference to specific embodiments, it should be understood by those skilled in the art that various changes in form and detail may be made therein without departing from the scope of the invention as recited in the accompanying claims.

What is claimed is:

1. An interface module for loading and unloading of a sample tray, comprising:
    a transfer drawer receiving apparatus comprising a device track and a drawer drive system configured to transport a transfer drawer along the device track into and out from a sample tray, the transfer drawer configured to receive a sample-vial carrier; and
    a window apparatus, comprising:
        a plate having an aperture therein to define a window;
        a first vertical post and a second vertical post;
        a bracket attached to the first vertical post by at least one bushing and attached to the second vertical post by a pair of guides;
        a window panel attached to the bracket, wherein the bracket is configured to be driven by a lead screw coupled to a motor such that the bracket and the window panel are movable vertically between a first position when the window is in a closed state and a second position when the window is in an open state, wherein, when the window is in the closed state, the window panel and device track seal the aperture and, wherein, when the window is in the open state, the drawer drive system is configured to transport the transfer drawer along the device track through the aperture; and
        at least one sensor attached to the plate to determine when the window is in the open state or closed state.

2. The interface module of claim 1 further comprising a sample manager, wherein the sample manager comprises a housing having an aperture therein, the housing defining an internal environment of the sample manager, the window panel being adjacent to the aperture in the housing when the window apparatus is attached to a side panel of the sample manager and the window panel is in the closed state.

3. The interface module of claim 2, wherein the window apparatus further comprises a conformable seal disposed on the window panel and engaging an outer surface of the housing to substantially seal the housing at the aperture in the housing when the window panel is in the first position.

4. The interface module of claim 1, further comprising a processor in communication with the window apparatus to control the window apparatus so that the window is in one of the open state and the closed state.

5. The interface module of claim 2, wherein the sample manager includes a front access door for user access to internal components of the sample manager.

6. The interface module of claim 3, wherein the conformable seal comprises a thermally-insulating conformable material disposed along a perimeter of the window panel.

7. The interface module of claim 1, wherein aside of the window panel facing the plate is covered with a thermally-insulating material.

8. The interface module of claim 1, wherein the at least one sensor comprises a first optical sensor and a second optical sensor attached to the plate wherein, when the window panel is in the first position, an optical flag on the plate blocks the first optical sensor and wherein, when the window panel is in the second position, the optical flag blocks the second optical sensor.

* * * * *